United States Patent Office 3,380,992
Patented Apr. 30, 1968

3,380,992
LINCOMYCIN DERIVATIVES AND PROCESS
FOR PREPARING SAME
Alexander D. Argoudelis and Brian Bannister, Kalamazoo, Herman Hoeksema, Cooper Township, Kalamazoo County, and Fred Kagan and Barney J. Magerlein, Kalamazoo, Mich., assignors to The Upjohn Company, Kalamazoo, Mich., a corporation of Delaware
No Drawing. Continuation-in-part of application Ser. No. 387,776, Aug. 5, 1964. This application June 14, 1965, Ser. No. 463,934
31 Claims. (Cl. 260—210)

This application is a continuation-in-part of copending application Ser. No. 387,776, filed Aug. 5, 1964.

This invention relates to a method of producing lincomycin and analogs and isomers thereof and to new compounds produced thereby.

Lincomycin is an antibiotic obtained as an elaboration product of a lincomycin-producing actinomycete. Methods for the production, recovery, and purification of lincomycin are described in U.S. Patent 3,086,912. Partly as a result of this invention the structure of lincomycin has been elucidated as methyl 6-(trans-4-propyl-1-methyl-L-2-pyrrolidinecarboxamido)-6,8-dideoxy-1-thio-D-erythro-α-D-galactooctopyranoside which has the following structural formula:

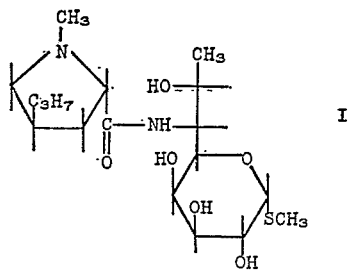

It has now been found that lincomycin and isomers and analogs thereof can now be synthesized by acylating with a 4-substituted L-proline of the formula:

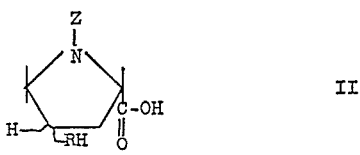

wherein Z is a protective hydrocarbyloxycarbonyl group which is removable by hydrogenolysis or trityl(triphenylmethyl), diphenyl(p-methoxyphenyl)methyl, bis-(p-methoxyphenyl)phenylmethyl, benzyl, or p-nitrobenzyl, and R is alkylidene, aralkylidene, or cycloalkylidene as given below, a 6-amino-6,8-dideoxy-D-erythro- or L-threo-D-galacto-octopyranose compound of the formula:

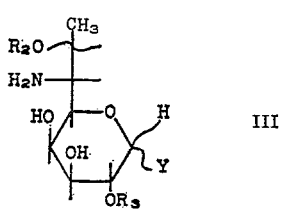

wherein $R_2$ and $R_3$ are hydrogen or alkyl of not more than 12 carbon atoms and wherein Y is hydrogen, S-alkyl of not more than 12 carbon atoms, and —$SCH_2CH_2OR_4$ wherein $R_4$ is hydrogen or alkyl of not more than 12 carbon atoms, to form compounds of the formula:

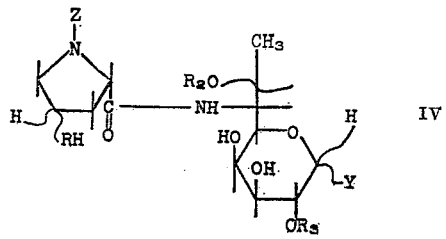

wherein Z, Y, R, $R_2$, and $R_3$ are as given above; removing the radical Z by hydrogenolysis; and, if desired, alkylating the resulting compound (Formula V wherein $R_1$ is hydrogen) to produce a compound of the formula:

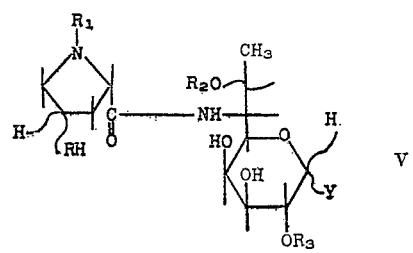

wherein $R_1$ is alkyl of not more than 20 carbon atoms, cycloalkyl of from three to not more than 8 carbon atoms, or aralkyl of not more than 12 carbon atoms and Y, R, $R_2$ and $R_3$ are as given above.

Examples of alkyl of not more than 20 carbon atoms are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof. Examples of cycloalkyl are cyclopropyl, cyclobutyl, cyclopentyl, cyclohexyl, cycloheptyl, cyclooctyl, 2-methylcyclopentyl, 2,3-dimethylcyclobutyl, 4-methylcyclobutyl, and 3-cyclopentylpropyl. Examples of aralkyl are benzyl, phenethyl, α-phenylpropyl, and α-naphthylmethyl. Examples of hydrocarbyloxycarbonyl groups are tertiary-butoxycarbonyl; benzyloxycarbonyl groups of the formula:

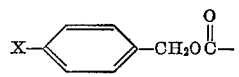

wherein X is hydrogen, nitro, methoxy, chloro, or bromo, for example, carbobenzoxy (benzyloxycarbonyl), p-nitrocarbobenzoxy (p-nitrobenzyloxycarbonyl), p-bromo-, and p-chlorocarbobenzoxy (p-bromo-, and p-chlorobenzyloxycarbonyl); and phenyloxycarbonyl groups of the formula:

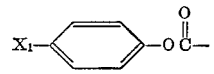

wherein $X_1$ is hydrogen, allyl, or alkyl of not more than 4 carbon atoms, such as phenyloxycarbonyl, p-tolyloxycarbonyl, p-ethylphenyloxycarbonyl, and allyloxycarbonyl and the like.

The starting compounds of Formula II are prepared by the following sequence:

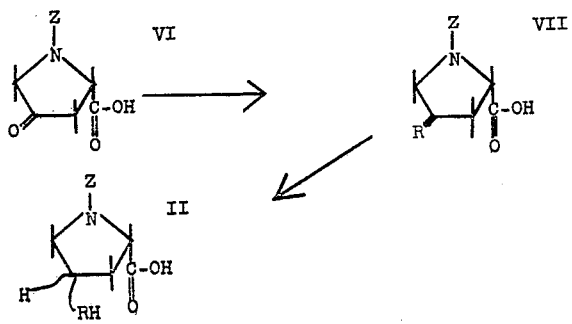

The resulting product is a mixture of the cis and trans isomers.

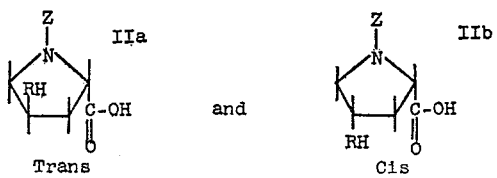

The above sequence is effected by treating a 1-hydrocarbyloxycarbonyl - 4-keto-L-proline (VI), or otherwise protected 4-keto-L-proline, with a Wittig reagent, usually an alkylidenetriphenylphosphorane (see e.g., Wittig et al., Ber., 87, 1348 (1954); Trippett, Quarterly Reviews, XVII, No. 4, p. 406 (1963)), and hydrogenating the obtained 4 - alkylidene-1-hydrocarbyloxycarbonyl-L-proline (VII) in the presence of a platinum catalyst to obtain the corresponding 4-alkyl-1-hydrocarbyloxycarbonylproline (II).

In carrying out the process the 1-hydrocarbyloxycarbonyl-4-keto-L-proline (VI), is added to a freshly prepared Wittig reagent. The Wittig reagents herein used can be generally represented by the following formula:

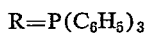=P(C$_6$H$_5$)$_3$  VIII wherein R= is alkylidene of not more than 12 carbon atoms, cycloalkylidene of from 3 to not more than 8 carbon atoms, and aralkylidene of not more than 12 carbon atoms. Suitable alkylidene, cycloalkylidene, and aralkylidene groups include methylene, ethylidene, propylidene, butylidene, pentylidene, hexylidene, heptylidene, octylidene, nonylidene, decylidene, undecylidene, and dodecylidene and the isomeric forms thereof, cyclopropylidene, cyclobutylidene, cyclopentylidene, cyclohexylidene, cycloheptylidene, cyclooctylidene, 2 - cyclopropylethylidene, 3-cyclohexylpropylidene, benzylidene, 2-phenylethylidene, 3-phenylpropylidene, and α-naphthylmethylene. These Wittig reagents are prepared by reacting an alkyl cycloalkyl, or aralkyltriphenylphosphonium halide with a base such as sodamide, or sodium or potassium hydride, or the sodium or potassium metalate of dimethylsulfoxide and the like. For example, the elimination of hydrogen halide from alkyltriphenylphosphonium halide, produces alkylidenetriphenylphosphorane. (The preparation of phosphoranes is discussed in detail by Trippett, Quart. Rev. XVII, No. 4, p. 406 (1963).) The reaction is generally carried out in an organic solvent, such as benzene, toluene, ether, dimethylsulfoxide, tetrahydrofuran, or the like, at temperatures between 10° C. and the reflux temperature of the reaction mixture. The thus-obtained product, a 4-alkylidene-, 4-cycloalkylidene-, or 4-aralkylidene-1-hydrocarbyloxycarbonyl-L-proline (VII), is recovered from the reaction mixture in a conventional manner, generally by extraction from aqueous solutions of the reaction mixture. The crude product can be purified by conventional means, such as recrystallization, chromatography, or formation and recrystallization of easily formed derivatives such as amine salts of the amino acid, e.g., the dicyclohexylamine salt, and the like, and liberating the amino acids from such compounds.

The thus-obtained 4-alkylidene-, 4-cycloalkylidene, or 4-aralkylidene-1-hydrocarbyloxycarbonyl-L-proline (VII) is then hydrogenated in the presence of platinum, which is generally deposited on a carrier for example, carbon or an anion exchange resin like Dowex–1, a cross-linked polystyrene trimethylbenzylammonium resin. A mixture of the cis- and trans-epimers of the 1-hydrocarbyloxycarbonyl-4-substituted-L-proline (IIa and IIb) is obtained.

Alternatively, the process can be carried out by acylating compound III with compound VIII to form a compound of the formula:

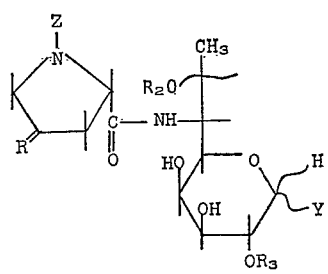

IVa and then hydrogenating the alkylidene group with a platinum or palladium catalyst. With a platinum catalyst as given above the Z radical is preserved but with a palladium catalyst, e.g., palladium on carbon, hydrogenolysis of the Z group concurrently with saturation of the alkylidene group is obtained.

The starting compounds of Formula III can be obtained in a variety of ways. Methyl 6-amino-6,8-dideoxy-1-thio-D-erythro-α-D-galacto-octopyranoside, also designated as methyl α-thiolincosaminide or MTL, is obtained by subjecting lincomycin to hydrazinolysis and ethyl 6-amino-6,8 - dideoxy - 1 - thio-D-erythro-α-D-galacto-octypyranoside, also known as ethyl α-thiolincosaminide or ETL, is obtained by hydrazinolysis of lincomycin C, an antibiotic obtained when the lincomycin fermentation of U.S. Patent 3,086,912 is carried out in the presence of ethionine.

The hydrazinolysis advantageous is effected by heating the antibiotic under reflux with an excess of hydrazine, say for 20 hours or more. The desired 6-amino-6,8-dideoxy-1-thio-D-erythro-α-D-galacto-octopyranoside can be isolated by distilling off the excess hydrazine and crystallizing from a polar solvent such as ethanol.

Other 6 - amino - 6,8 - dideoxy - 1 - thio-D-erythro-α-

D-galacto-octopyranosides can be prepared by the following representative sequences:

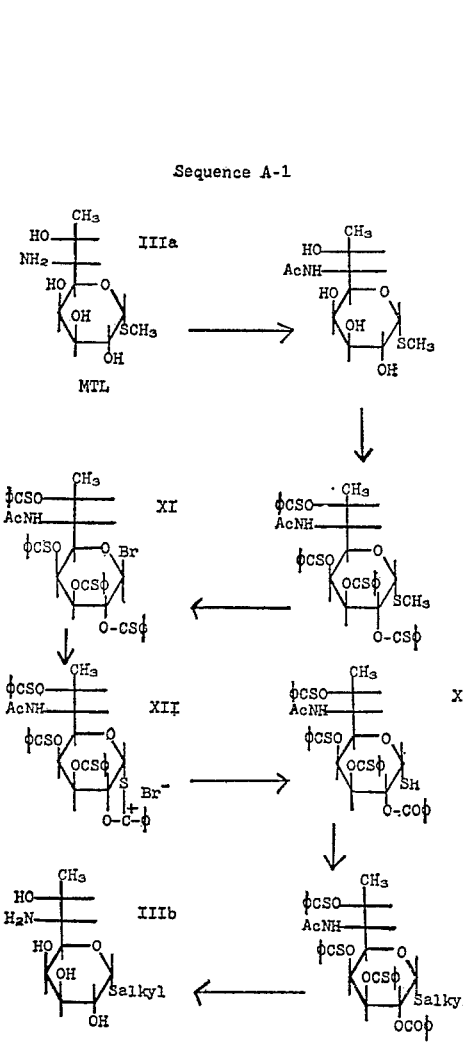

Ac is alkanoyl or aralkanoyl of not more than 12 carbon atoms. Examples are formyl, acetyl, propionyl, butyryl, valeryl, hexanoyl, heptanoyl, octanoyl, nonanoyl, decanoyl, undecanoyl, dodecanoyl, and the isomeric forms thereof, and benzoyl, phenylacetyl, 3-phenylpropionyl, 4 phenylbutyryl, 5-phenylvaleryl and the isomeric forms thereof.

The process is effected as follows: Methyl α-thiolincosaminide is N-acylated, the methyl N-acyl-α-thiolincosaminide (IX) then O-acylated with thiobenzoyl chloride, and the resulting thiobenzoyl ester (X) is brominated to form compound XI which on treatment with a base is converted to compound XII. Treatment of compound XII with mild alkali (aq. carbonate-bicarbonate) gives compound XIII which on alkylation with an alkyl halide yields compound XIV. Hydrolysis of the benzoyl and thiobenzoyl groups and hydrazinolysis of the N-acyl group gives compound IIIb. In a like manner compounds in which Y is 2-hydroxyethyl or 2-alkoxy-ethyl can be prepared by reacting compound XIII with ethylene chlorohydrin or a 2-alkoxyethyl halide.

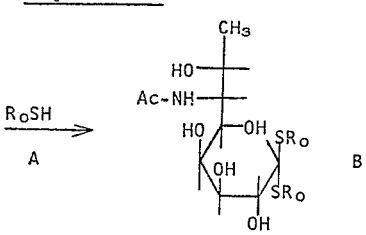

Ac can be alkanoyl or aralkanol as above or an acyl of the formula:

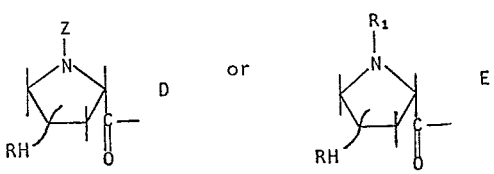

wherein R, $R_1$ and Z are as given above. $R_o$ can be alkyl of 2 to not more than 12 carbon atoms, or $$—CH_2CH_2OR_4$$

wherein $R_4$ is as given above. The starting glycoside A, which advantageously can be lincomycin, is subjected to mercaptalation with a mercaptan of formula $R_oSH$ to form the dithioacetal B which, in turn, is cyclized by heat and/or acid to form the thioglycoside C.

The β-epimers of the above can be prepared by the following representative sequence:

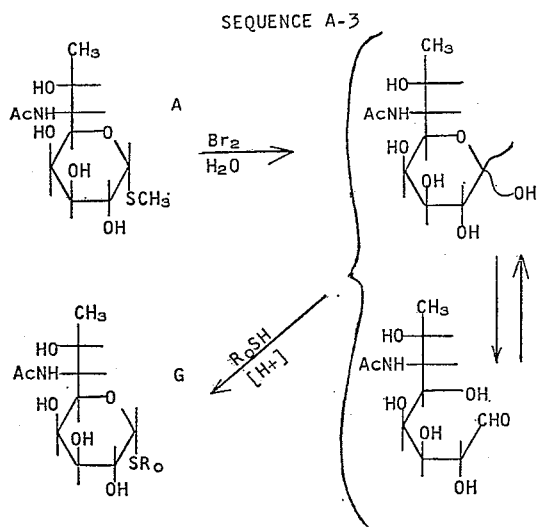

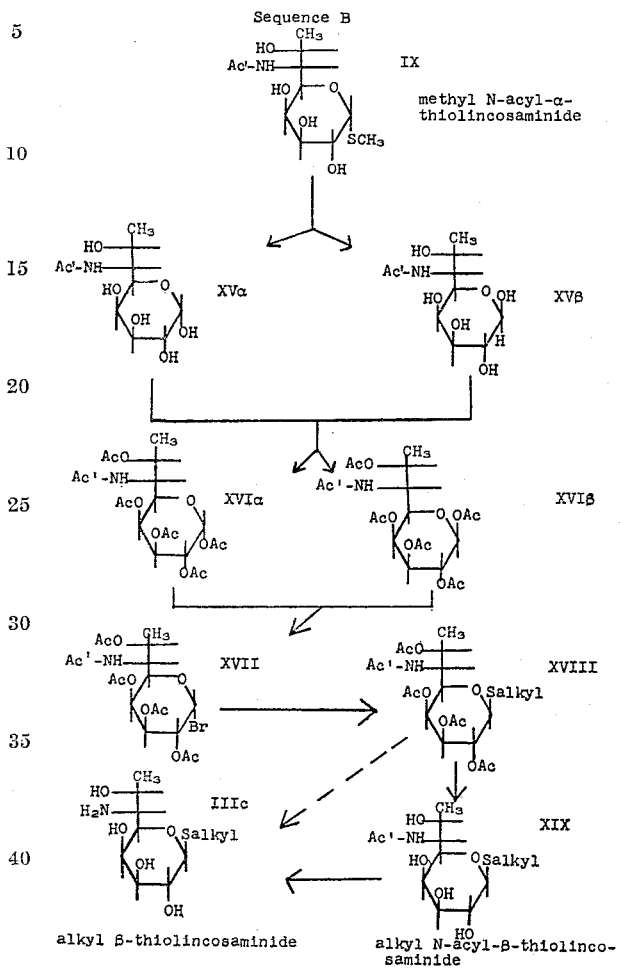

Ac and $R_o$ are as given in Sequence A-2. The starting compound, A, is dissolved in water as a soluble salt, e.g., the hydrochloride, and bromine is added with cooling, advantageously to between about −10 and 20° C. A satisfactory procedure is to cool the aqueous solution to about 0° C. and the bromine is added dropwise. The stoichiometric amount of bromine is 1 mole for each mole of starting compound, though more or less can be used. Advantageously a slight excess, say from 5 to 20% excess, of bromine is used. The thioglycoside is thus converted to a sugar, F, in which the pyranose form Fa is in equilibrium with the aldose form Fb. This sugar can be isolated if desired but ordinarily this is neither necessary nor desirable. In the presence of acid, e.g, hydrochloric acid or other strong non-oxidizing acid such as p-toluenesulfonic acid, and sulfonic acid type anion exchange resins, the mercaptan $R_oSH$ reacts with the sugar F to form the thioglycoside G. Effective conversion is obtained by introducing the mercaptan, $R_oSH$, into the aqueous solution resulting from the bromination and treating the resulting system, which will ordinarily be a two phase system because of the insolubility of the mercaptan with hydrogen chloride gas or concentrated hydrochloric acid advantageously with cooling to a temperature between about −10 and +20° C. A satisfactory procedure is to cool the reaction mixture to 0° C. and to bubble into it hydrogen chloride gas. It is advantageous, especially with the longer chain mercaptans, to partially solubilize them by the addition of tetrahydrofuran to the reaction mixture. Advantageously from 15 to 20 parts of tetrahydrofuran for each part of water is used. The temperature of the reaction may be allowed to rise, advantageously not higher than about 55° C., during the addition of hydrogen chloride gas. After cooling to about 25° C., the tetrahydrofuran is removed under vacuum. The reaction mixture can be worked up in the usual way which may include solvent extraction at an acidic pH, solvent extraction at a basic pH, fractional liquid-liquid extractions such as counter current distribution or partition chromatography, crystallization, and the like. Concomitantly some dithioacetal of Formula B (Sequence A-2) may be formed which after separation can be cyclized as described above to form more of the desired thioglycoside G.

Ac and $Ac_1$ can be alkanoyl or aralkanoyl of not more than 12 carbon atoms as given above.

The process is effected as follows: treating methyl N-acyl-α-thiolincosaminide (IX) with mercuric chloride in a warm aqueous solution to obtain a mixture of 6-acylamino - 6,8 - dideoxy - D - erythro - α - D-galacto-octopyranose or N-acyl - α - lincosamine (XVα) and N-acyl-β-lincosamine (XVβ); acylating this mixture with an acylating reagent selected from acyl halides and acid anhydrides to obtain a mixture of N-acyl-1,2,3,4,7-penta-O-acyl-α- and β-lincosamine (XVIα and XVIβ); treating compound XVIα or compound XVIβ or a mixture of compounds XVIα and XVIβ with hydrogen bromide in acetic acid to obtain 6-acylamino-2,3,4,7-tetra-O-acyl-1α-bromo - 1,6,8-trideoxy - D - erythro - D - galacto-octopyranose or N-acyl - 2,3,4,7 - tetra-O-acyl-1α-bromo-1-deoxylincosamine (XVII); treating compound XVII successively with thiourea, a mixture of potassium carbonate and sodium bisulfite in water, and an alkyl iodide to obtain alkyl N - acyl - 2,3,4,7 - tetra-O-acyl-β-thiolincosaminide (XVIII); treating compound XVIII with dry ammonia gas in methanol to obtain alkyl N-acyl-β-thiolincosaminide (XIX). Hydrazinolysis of compound XIX or of compound XVIII gives the alkyl β-thiolincosaminide (IIIc). In a like manner compounds in which Y (Formula III) is 2-hydroxyethylthio or 2-alkoxyethylthio can be prepared by reacting compound XVII with ethylenechlorhydrin or a 2-alkoxyethyl halide.

Compounds of Formula III where Y is hydrogen can be obtained by the following representative sequence:

Sequence C

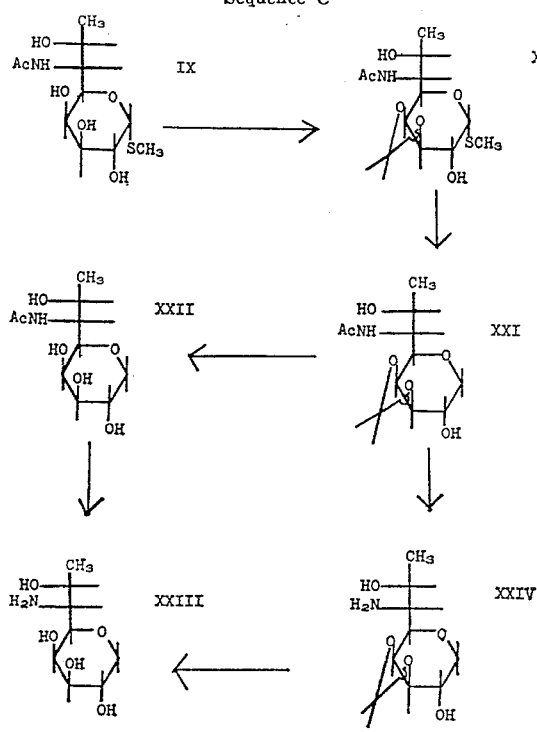

The process is carried out as follows: methyl N-acyl-α-thiolincosaminide (IX) (or methyl N-acyl-β-thiolincosaminide) is treated with acetone in the presence of sulfuric acid to form methyl N-acyl-3,4-O-isopropylidene-α-thiolincosaminide (XX) which can be desulfurized with Raney nickel in ethanol to 6-acylamino-3,4-O-isopropylidene-1,6,8-trideoxy-D-erythro-D-galacto-octopyranose, or N-acyl-3,4-O-isopropylidene-1-deoxylincosamine (XXI). The desulfurization advantageously is achieved by heating under reflux in ethanol with loosely packed Raney nickel for a period of 2 to 24 hours. Thereafter, the catalyst is removed by filtration and the filtrate is evaporated to give a residue which can be purified by conventional means such as recrystallization from organic solvents. The isopropylidene group can be removed by mild acid hydrolysis, e.g., 80% aqueous acetic acid or a dilute mineral acid such as hydrochloric acid or sulfuric acid, to give N-acyl-1-deoxylincosamine (XXII) and the N-acyl by hydrazinolysis to give 1-deoxylincosamine (XIII). Alternatively, the hydrazinolysis can be effected first to give 3,4-O-isopropylidene-1-deoxylincosamine (XXIV). Advantageously, however, the isopropylidene group is removed first.

Starting D-erythro-D-galacto- compounds of Formula III wherein $R_2$ and/or $R_3$ is alkyl of not more than 12 carbon atoms can be obtained by the following representative sequence:

Sequence D

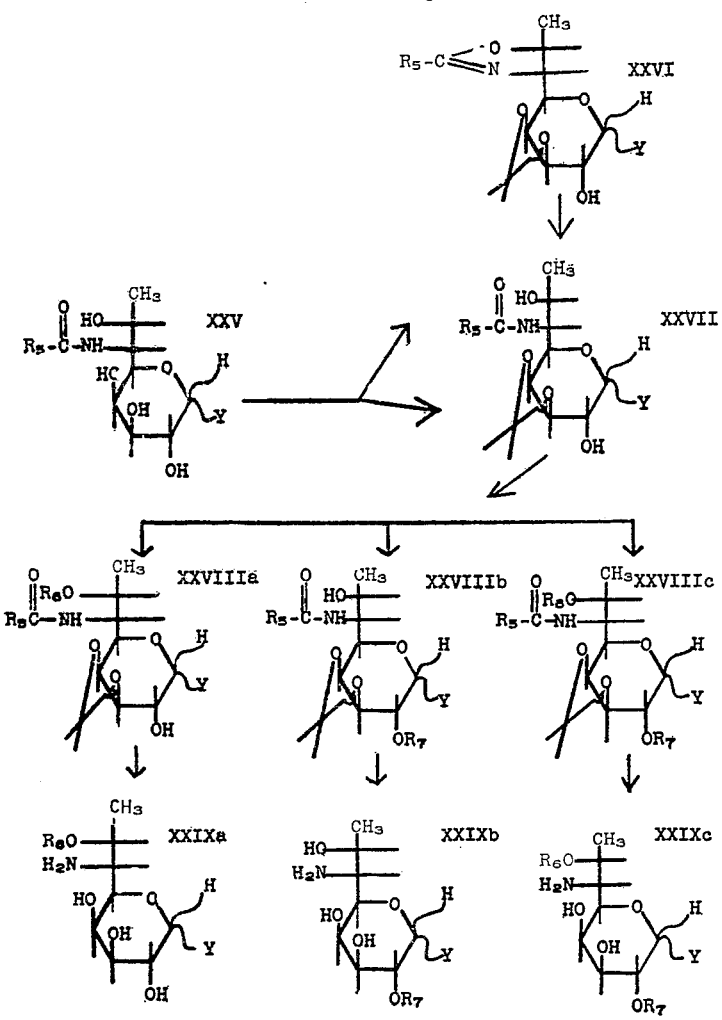

can be alkanoyl or aralkanoyl of not more than 12 carbon atoms as given above. $R_6$ and $R_7$ can be different alkyls if compounds XXVIIIa and/or XXVIIIb are alkylated with a different alkylating agent from that used to alkylate compound XXVII. $R_6$ and $R_7$ in compound XXVIIIc can thus be different alkyls.

The process is effected as follows: treating a 6-acylamino - 6,8 - dideoxy - D - erythro - D - galacto - octopyranose compound of Formula XXV with dry acetone in the presence of an acid catalyst, for example, sulfuric acid, to give a mixture of compound XXVII and the oxazoline derivative thereof XXVI; hydrolyzing compound XXVI in hot water to convert it to compound XXVII; methylating compound XXVII with an alkyl halide, for example alkyl chlorides, alkyl bromides, or alkyl iodides of not more than 12 carbon atoms, in the presence of a base and separating the three products thus obtained (compound XXVIIIa, compound XXVIIIb, and compound XXVIIIc); and hydrolyzing the compounds XXVIII under mild hydrolyzing conditions, for example, with 80% aqueous acetic acid or a dilute mineral acid, such as, hydrochloric acid or sulfuric acid, to eliminate the isopropylidene moiety and treating with hydrazine to remove the N-acyl group to give the compounds XXIX. When Y is 2-hydroxyethylthio in the above sequence or when 2 - hydroxyethel 6 - amino - 6,8 - dideoxy - 7 - O-methyl - 1 - thio - D - erythro - α - D - galacto - octopyranoside, also known as 2-hydroxyethyl α-thiocelestosaminide, obtained by the hydrazinolysis of celesticetin, an antibiotic produced according to U.S. Patent 2,928,-844, is used, the 2-hydroxy group will also be alkylated to give a 2-alkoxyethylthio group in which the alkoxy group will contain not more than 12 carbon atoms according to the alkyl halide used to alkylate. When desired the 2-hydroxythio group can be preserved by protecting it with a trityl group. Thus compounds XXV or XXVII where Y is 2-hydroxyethylthio can be reacted with trityl chloride (triphenylmethylchloride) chlorodiphenyl - (p - methoxyphenyl)methane, or chloro - bis- (p - methoxyphenyl)phenylmethane, to convert Y to a 2-trityloxyethylthio and the trityl group removed by mild hydrolysis, for example with 80% aqueous acetic acid, after the alkylation. The 2-hydroxy group can be alkylated with a different alkyl group.

In carrying out this process 6-acylamino-6,8-dideoxy-D - erythro - D - galacto - octopyranose compound of Formula XXV is suspended in dry acetone. An acid catalyst, such as sulfuric acid, p - toluenesulfonic acid, o - toluenesulfonic acid, p - ethylbenzenesulfonic acid, or the like, is added to the suspension, with sulfuric acid preferred. The acetone is generally used in large excess, such as a volume of 20 to 200 times the amount of compound XXV. The acid catalyst is used in a quantity between 0.25 and 5% by weight with respect to the acetone. The reaction can be carried out between 10° C. and the reflux temperature of the solution, but is generally carried out at room temperature. The reaction time is between 15 minutes and 6 hours, depending on the temperature, after which the reaction mixture is neutralized to terminate the reaction. The inorganic salts precipitated by the neutralization are removed by filtration, and the filtrate is evaporated to give a mixture containing crystalline solids. This mixture is separated with water into a water-soluble and water-insoluble fraction; the water-soluble material is compound XXVII; the insoluble fraction is the oxazoline derivative thereof (XXVI).

The water-insoluble oxazoline derivative (XXVI) can be converted to compound XXVII by heating with water. After this hydrolysis is complete, the product is obtained by evaporating the solution until crystallization occurs.

The alkylation of compound XXVII is performed with an alkyl halide, preferably an alkyl chloride, bromide or iodide, in the presence of a strong base. As alkylating agents, methyl iodide, methyl bromide, ethyl iodide, ethyl bromide, and propyl, butyl, isobutyl, pentyl, hexyl, heptyl, octyl, nonyl, decyl, undecyl, dodecyl chlorides, bromides and iodides and any of the branched-chain alkyl chlorides, bromides or iodides having up to 12 carbon atoms can be used. As a base, alkoxides, such as sodium methoxide, potassium methoxide, potassium isopropoxide, potassium tert-butoxide, sodium tert-butoxide, and sodamide and the like can be used. The alkylation can be performed at a temperature between 0° and 50° C. using inert solvents such as benzene, toluene, dioxane, tetrahydrofuran, nad the like. After the reaction is terminated (usually between ½ hour and 3 hours) the reaction mixture is filtered to remove solids, such as sodium or potassium chloride, bromide or iodide, and the filtrate is evaporated in vacuo to a syrupy residue. The three products therein, namely compound XXVIIIa, compound XXVIIIb, and compound XXVIIIc, are separated by conventional methods, for example, by chromatography or by countercurrent distribution. The removal of the N-acyl and isopropylidene groups is effected as described above for sequence C. It will be understood that 2-O-, and 7-O-, and 2,7-di-O-alkylates according to Formulas XXIXa, XXIXb, and XXIXc can be used in sequences A, B, and C to give the 2-O, 7-O, and 2,7-di-O-alkylates of compounds produced in these sequences.

The 7-O-epimers of the compounds III, i.e., the 6-amino-6,8-dideoxy-L-threo-D-galacto-octopyranose compounds, can be obtained by using as the starting compound epi MTL (methyl 6-amino-6,8-dideoxy-1-thio-L-threo-α-D-galacto-octopyranoside) having the formula:

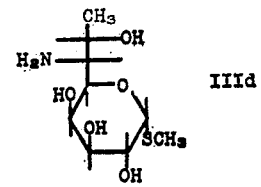

The epi-MTL can be prepared by the following representative sequence:

Sequence E

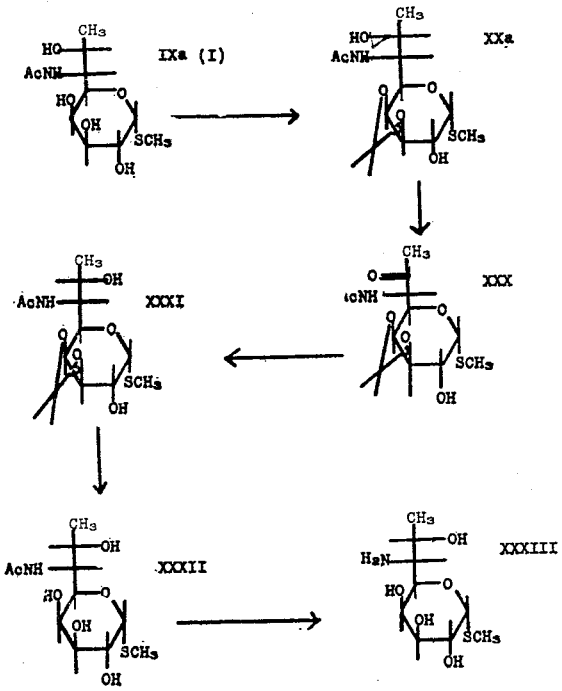

Ac can be alkanoyl or aralkanoyl of not more than 12 carbon atoms as given above or trans-4-propyl-1-methyl-L-prolyl in which case IX is lincomycin (I) and XXXII is epilincomycin[methyl] 6-(trans-4-propyl-1-methyl-L-2-pyrrolidinecarboximido)-6,8-dideoxy-1-thio-L-threo-$\alpha$-D-galacto-octopyranoside Alternatively the above sequence can be applied to any of the 6-amino-6,8-dideoxy-D-erythro-D-galacto-octopyranose compound of Formula III (or N-acylates thereof) disclosed above.

In carrying out the process the starting compound is an N-acyl derivative of a 6-amino-6,8-dideoxy-D-erythro-D-galacto-octopyranose compound of Formula III which advantageously is lincomycin. Thus in an illustrative procedure lincomycin (I) is reacted with acetone to form the 3,4-O-isopropylidene derivative XXa by the procedure described above for sequences C and D. As the starting compound is lincomycin formation of the oxazoline XXVI is minimized. The 3,4-O-isopropylidene-lincomycin, XXa, is then oxidized with chromic acid to form the 7-dehydro derivative, XXX, which in turn is reduced with borohydride to a mixture of 3,4-O-isopropylidene-lincomycin and 3,4-O-isopropylidene-epilincomycin (XXXI). The two epimers can be separated by fractional liquid-liquid extraction, for example, countercurrent distribution or partition chromatography, or by adsorption or gradient chromatography, or the mixture can be converted to a mixture of lincomycin (I) and epilincomycin (XXXII) and the two epimers then separated by like procedures. Removal of the 3,4-O-isopropylidene group can be effected by mild hydrolysis as described above for sequence C, to give epilincomycin (XXXII) which in turn can be deacylated with hydrazine as described above to form the desired methyl epi-$\alpha$-thiolincosaminide (methyl 6-amino-6,8-dideoxy-1-thio-L-threo-$\alpha$-D-galacto-octopyranoside) or the hydrazinolysis can be effected first and the removal of the isopropylidene group last as described for sequence C.

Removal of the protective group Z in compounds of Formula IV is effected by hydrogenolysis using a palladium catalyst. The palladium is usually deposited on a carrier, for example, carbon. Any of the conventional methods of hydrogenolysis can be used.

The proline nitrogen in compounds of Formula V where $R_1$ is hydrogen can be alkylated with an alkyl halide, for example, an alkyl iodide. Milder conditions than those given above for alkylating the 2-O and 7-O-positions are used. Thus the N-alkylation can be effected without a strong base and at room temperature or at most with mild heating, say, to not more than 50° C. or so. Advantageously the alkylation is effected by reacting the compound with an oxo (an aldehyde or a ketone) and hydrogenating the resulting adduct. The hydrogenation can be effected with palladium or platinum as the catalyst or any hydrogenating catalyst effective to saturate an olefinic double bond. Suitable oxo compounds have the formula: $R_8R_9CO$ where $R_8R_9C=$ is alkylidene of not more than 20 carbon atoms, cycloalkylidene of from 3 to not more than 8 carbon atoms, or aralkylidene of not more than 12 carbon atoms. Examples are formaldehyde, acetaldehyde, propionaldehyde, butyraldehyde, acetone, isobutyl methyl ketone, benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3-cyclopentanepropionaldehyde, cyclohexaneacetaldehyde, cycloheptanecarboxaldehyde, 2,2-dimethylcyclopropylacetaldehyde, 2,2-dimethylcyclopropyl methyl ketone, cyclopentyl methyl ketone, cyclobutyl methyl ketone, cyclobutanone, cyclohexanone, 4-methylcyclohexanone, and the like.

The cis and trans epimers can be separated by partition or gradient chromatography. The separation can be effected most advantageously at the stage represented by Formulas IV or V. The respective epimers can also be formed by starting with the trans or cis forms of the 4-substituted-L-prolines (Formulas IIa and IIb).

Various acid-addition salts of the free base form of the compounds of Formula V wherein $R_1$ is hydrogen, alkyl, cycloalkyl, or aralkyl as given above, can be made by neutralizing the free base with the appropriate acid to below about pH 7.0, and advantageously to about pH 2 to pH 6. Suitable acids for this purpose include hydrochloric,
sulfuric,
phosphoric,
thiocyanic,
fluosilicic,
hexafluoroarsenic,
hexafluorophosphoric,
acetic,
succinic,
citric,
lactic,
maleic,
fumaric,
pamoic,
cholic,
palmitic,
mucic,
camphoric,
glutaric,
glycolic,
phthalic,
tartaric,
lauric,
stearic,
salicylic,
3-phenylsalicylic,
5-phenylsalicylic,
3-methylglutaric,
orthosulfobenzoic,
cyclohexanesulfamic,
cyclopentanepropionic,
1,2-cyclohexanedicarboxylic,
4-cyclohexenecarboxylic,
octadecenylsuccinic,
octenylsuccinic,
methanesulfonic,
benzenesulfonic,
helianthic,
Reinecke's,
dimethyldiethiocarbamic,
cyclohexylsulfamic,
hexadecylsulfamic,
octadecylsulfamic,
sorbic,
monochloroacetic,
undecylenic,
4'-hydroxyazobenzene-4-sulfonic,
octyldecylsulfuric,
picric,
benzoic,
cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate, and the aqueous solution of the salt extracted with various water-immiscible solvents before regenerating the free base form by treatment of the thus-extracted acid solution or converted to another salt by metathesis.

The compounds of Formula V where $R_1$ is hydrogen, alkyl, cycloalkyl, or aralkyl as given above, can be used as a buffer or as an antacid. The compounds of Formulas IV and V react with isocyanates to form urethanes and can be used to modify polyurethane resins. The long chain compounds, i.e., where $R_1$ is alkyl of from 8 carbon atoms up, have surface active properties and can be used as wetting and emulsifying agents. The thiocyanic acid addition salt when condensed with formaldehyde forms resinous materials useful as pickling inhibitors according to U.S. Patents 2,425,320 and 2,606,155. The free bases also make good vehicles for toxic acids. For example, the fluosilicic acid addition salts are useful as mothproofing agents according to U.S. Patents 1,915,334 and 2,075,359 and the hexafluoroarsenic acid and hexafluorophosphoric acid addition salts are useful as parasiticides according to U.S. Patents 3,122,536 and 3,122,552.

The close analogues of lincomycin, i.e., where RH- is trans-alkyl of not more than 6 carbon atoms; $R_1$ is methyl or ethyl; and Y is α-alkylthio of not more than 6 carbon atoms, have antibacterial properties comparable to lincomycin and can be used for the same purposes as lincomycin. The other analogues and isomers have similar antibacterial properties but to a lesser degree and can be used for the same purposes as lincomycin where larger amounts are not objectionable.

The following examples are illustrative of the process and products of the present invention but are not to be construed as limiting. The parts and percentages are by weight and the solvent ratios are by volume unless otherwise specified.

EXAMPLE 1.—METHYL 6-(CIS- AND TRANS-4-ALKYL-1-ALKYL-L - 2 - PYRROLIDINECARBOXAMIDO-6,8-DIDEOXY-1-THIO-D-ERYTHRO-α - D-GALACTOOCTOPYRANOSIDE (METHYL N(CIS- AND TRANS-4-ALKYL-1-ALKYL-L-PROLYL) - α-THIOLINCOSAMINIDES)

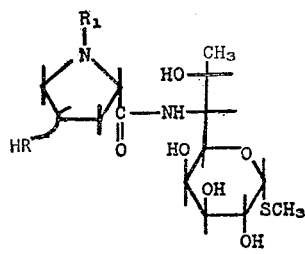

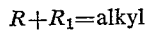

$R+R_1$=alkyl

XXXIV (A) *4-alkylidene-1-carbobenzoxyl-L-proline and the dicyclohexylamine salt thereof*

(A-1) 4-butylidene-1-carbobenzoxy-L-proline and the dicyclohexylamine salt thereof: Sodium hydride (19 g.) as a 53% suspension in mineral oil was warmed with 350 ml. of dimethylsulfoxide at a temperature of 70–75° C. until the reaction was complete (about 30 minutes). After cooling to 32° C., 16.2 g. of butyltriphenylphosphonium bromide was added, and the resulting reaction mixture was stirred for 1 hour to insure complete reaction. A solution of 26 g. of 4-keto-1-carbobenzoxy-L-proline in 100 ml. of dimethylsulfoxide was added, and the resulting mixture was heated at 70° C. for 3 hours. The reaction mixture was cooled to 25° C. and 1 liter of 2.5% aqueous potassium bicarbonate added. This mixture was washed twice with 700 ml. portions of ether and the ether was discarded after back extracting with 150 ml. of 2.5% aqueous potassium bicarbonate. The bicarbonate solutions were combined and acidified with 4 N hydrochloric acid. The acidified mixture was extracted with four 500-ml. portions of ether. The combined ether extracts were washed successively with 250 ml. of water, three 250-ml. portions of saturated aqueous sodium bisulfite, and 250 ml. of water, and dried over anhydrous sodium sulfate. Evaporation of the solvent under vacuum gave 24 g. of an oily residue which was 4-butylidene-1-carbobenzoxy-L-proline.

This residue was dissolved in 31 ml. of acetonitrile and treated with 18 ml. of dicyclohexylamine and refrigerated. The crystals were collected, washed with acetonitrile and dried in vacuo giving 21 g. (46.8%) of the crystalline dicyclohexylamine salt melting at 136–140° C. After two recrystallizations from acetonitrile, an analytical sample was obtained which melted at 142–144° C. and had a rotation of $[\alpha]_D$ —4° (c.=0.99, $CHCl_3$).

*Analysis.*—Calcd. for $C_{29}H_{44}N_2O_4$: C, 71.86; H, 9.15; N, 5.78. Found: C, 71.69; H, 9.30; N, 5.74.

Ten grams of the dicyclohexylamine salt of 4-butylidene-1-carbobenzoxy-L-proline was shaken with ether and excess 5% aqueous potassium hydroxide until no solid remained. The layers were separated and each one was backwashed. The aqueous alkaline layer was combined with the backwash from the ether layer and acidified with 4 N hydrochloric acid. The mixture was repeatedly extracted with ether and the ether extracts were combined, dried over sodium sulfate, and evaporated in vacuo to give 6.3 g. (93%) of 4-butylidene-1-carbobenzoxy-L-proline as an oil.

(A–2) 4-pentylidene-1-carbobenzoxy-L-proline and the dicyclohexylamine salt thereof: Following the procedure of Part A–1 substituting the butyltriphenylphosphonium bromide by pentyltriphenylphosphonium bromide, 4-pentylidene-1-carbobenzoxy-L-proline and the dicyclohexylamine salt thereof were obtained. The free acid was an oil but the dicyclohexylamine salt after recrystallization from acetonitrile had a melting point of 124–128° C., an optical rotation of $[\alpha]_D$ —6° (c. 0.762, $CHCl_3$), and the following analysis:

Calcd. for $C_{30}H_{46}N_2O_4$: C, 72.25; H, 9.30; N, 5.62. Found: C, 72.38; H, 9.52; N, 5.97.

(A–3) 4-hexylidene-1-carbobenzoxy-L-proline and the dicyclohexylamine salt thereof: Following the procedure of Part A–1 substituting the butyltriphenylphosphonium bromide by hexyltriphenylphosphonium bromide, 4-hexylidene-1-carbobenzoxy-L-proline and the dicyclohexylamine salt thereof were obtained. The free acid was an oil but the dicyclohexylamine salt after recrystallization from acetonitrile had a melting point of 109–111° C., an optical rotation of $[\alpha]_D$ —7° (c. 0.941, $CHCl_3$), and the following analysis:

Calcd. for $C_{31}H_{48}N_2O_4$: C, 72.62; H, 9.44; N, 5.46. Found: C, 72.70; H, 9.43; N, 5.71.

(A–4) 4-octylidene-1-carbobenzoxy-L-proline and the dicyclohexylamine salt thereof: Following the procedure of Part A–1 substituting the butyltriphenylphosphonium bromide by octyltriphenylphosphonium bromide, 4-octylidene-1-carbobenzoxy-L-proline and the dicyclohexylamine salt thereof were obtained. The free acid was an oil but the dicyclohexylamine salt after recrystallization from acetonitrile had a melting point of 113–118° C., an optical rotation of $[\alpha]_D$ —11° (c. 1.020, $CHCl_3$), and the following analysis:

Calcd. for $C_{33}H_{52}N_2O_4$: C, 73.29; H, 9.69; N, 5.18. Found: C, 73.32; H, 10.06; N, 5.28.

(B) *4-alkyl-1-carbobenzoyl-L-proline*

(B–1) 4-butyl-1-carbobenzoxy-L-proline: The oil from Part A–1 was hydrogenated in 200 ml. of methanol over 2.1 g. of 10% platinum on Dowex-1 catalyst under 40 lbs. hydrogen pressure. The catalyst was removed by filtration and the filtrate evaporated to yield 6.3 g. of 4-butyl-1-carbobenzoxy-L-proline as an oil. The product contained about 2 parts cis-4-butyl-1-carbobenzoxy-L-proline to each part of trans-4-butyl-1-carbobenzoxy-L-proline.

(B–2) 4-pentyl-1-carbobenzoxy-L-proline: Hydrogenation of the oily free acid from Part A–2 by the procedure of Part B-1 gave 4-pentyl-1-carbobenzoxy-L-proline as an oil.

(B-3) 4-hexyl-1-carbobenzoxy-L-proline: Hydrogenation of the oily free acid from Part A-3 by the procedure of Part B-1 gave 4-hexyl-1-carbobenzoxy-L-proline as an oil.

(B-4) 4-octyl-1-carbobenzoxy-L-proline: Hydrogenation of the oily free acid from Part A-4 by the procedure of Part B-1 gave 4-octyl-1-carbobenzoxy-L-proline as an oil.

(C) *Methyl 6-amino-6,8-dideoxy-1-thio-D-erythro-α-D-galacto-octopyranoside (methyl α-thiolincosaminide)*

A solution of 40 g. of lincomycin (U.S. Patent 3,086,912) in 20 ml. of hydrazine hydrate (98–100%) was refluxed for 21 hours; excess hydrazine hydrate was then removed in vacuo under nitrogen at steam bath temperature, leaving a residue. The residue, a pasty mass of crystals, was cooled, acetonitrile was added, and the mixture was stirred until the crystals were suspended. The crystals were collected on a filter, washed with acetonitrile and with ether. The yield of white, crystalline methyl α-thiolincosaminide after drying in vacuo at room temperature was 21 g. (84%). Recrystallization was accomplished by dissolving methyl α-thiolincosaminide in hot dimethylformamide and adding an equal volume of ethylene glycol dimethyl ether.

Methyl α-thiolincosaminide has a melting point of 225–228° C., an optical rotation of $[\alpha]_D^{25} +276°$ (c.=.768, water) and a pKa' of 7.45.

Calcd. for $C_9H_{19}NO_5S$: C, 42.7; H, 7.56; N, 5.53; S, 12.66. Found: C, 42.6; H, 7.49; N, 5.75; S, 12.38.

(D) *Methyl N-(4-alkyl-1-carbobenzoxy-L-prolyl)- -thiolincosaminide* lincosaminide

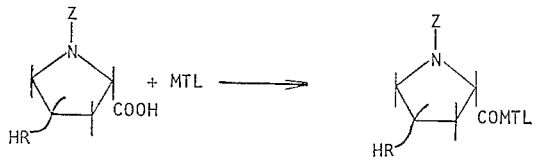

(D-1) Methyl N-(4-butyl-1-carbobenzoxy-L-prolyl)-α-thiolincosaminide: To a solution of 6.3 g. of 4-butyl-1-carbobenzoxy-L-proline (the oil from Part A) in 175 ml. of distilled acetonitrile cooled to 0° was added 3.46 ml. of triethylamine followed by 3.34 ml. of isobutyl chloroformate. The mixture was stirred at 0° C. (±3°) for 15 min. A solution of 6.2 g. of methyl α-thiolincosaminide (MTL) from Part B in 85 ml. of water was added, and the reaction mixture was stirred at 0° C. for 0.5 hr. and at 25° C. for 1 hr. The reaction product was then filtered and dried yielding 4.57 g. (37.7%) of methyl N-(4-butyl-1-carbobenzoxy-L-prolyl)-α-thiolincosaminide. The mother liquor was concentrated under vacuum and an additional 4.25 g. (35.2%) of product recovered. Recrystallization from acetonitrile produced crystals of methyl N-(4-butyl-1-carbobenzoxy-L-prolyl)-α-thiolincosaminide melting at 194–196° C. A second recrystallization from acetonitrile afforded an analytical sample, M.P. 197.5–200° C., $[\alpha]_D +111°$ (c.=0.98, MeOH).

Calcd. for $C_{26}H_{40}N_2O_8S$: C, 57.75; H, 7.46; N, 5.13; S, 5.93. Found: C, 57.58; H, 7.16; N, 5.50; S, 6.07.

(D-2) Methyl N-(4-pentyl-1-carbobenzoxy-L-prolyl)-α-thiolincosaminide: Following the procedure of Part D-1 substituting the 4-butyl-1-carbobenzoxy-L-proline by 4-pentyl-1-carbobenzoxy-L-proline (the oil of Part B-2), there was obtained methyl N-(4-pentyl-1-carbobenzoxy-L-prolyl)-α-thiolincosaminide having a melting point of 191–193° C., an optical rotation of $[\alpha]_D +108°$ (c.=0.722, MeOH) and the following analysis:

Calcd. for $C_{27}H_{42}N_2O_8S$: C, 58.46; H, 7.63; N, 5:05. Found: C, 58.32; H, 7.52; N, 4.95.

(D-3) Methyl N-(4-hexyl-1-carbobenzoxy-L-prolyl)-α-thiolincosaminide: Following the procedure of Part D-1 substituting the 4-butyl-1-carbobenzoxy-L-proline by 4-hexyl-1-carbobenzoxy-L-proline (the oil of Part B-3), there was obtained methyl N-(4-hexyl-1-carbobenzoxy-L-prolyl)-α-thiolincosaminide having a melting point of 176–180° C., an optical rotation of $[\alpha]_D +103°$ (c.=0.951, methanol), and the following analysis:

Calcd. for $M_{28}H_{44}N_2O_8S$: C, 59.13; H, 7.80; N, 4.93; S, 5.64. Found: C, 59.16; H, 7.46; N, 5.09; S, 5.96.

(D-4) Methyl N-(4-octyl-1-carbobenzoxy-L-prolyl)-α-thiolincosaminide: Following the procedure of Part D-1 substituting the 4-butyl-1-carbobenzoxy-L-proline by 4-octyl-1-carbobenzoxy-L-proline (the oil of Part B-4), there was obtained methyl N-(4-octyl-1-carbobenzoxy-L-prolyl-α-thiolincosaminide having a melting point of 181–202° C., an optical rotation of $[\alpha] +99°$ (c.=1.083, methanol), and the following analysis:

Calcd. for $C_{30}H_{48}N_2O_8S$: C, 60.38; H, 8.11; N, 4.70; S, 5.37. Found: C, 60.35; H, 8.08; N, 4.73.

(E) *Methyl N-(4-alkyl-L-prolyl)-α-thiolincosaminide hydrochloride*

(E-1) Methyl N-(4-butyl-L-prolyl)-α-thiolincosaminide hydrochloride: A solution of 7.8 g. of methyl N-(4-butyl-1-carbobenzoxy-L-prolyl)-α-thiolincosaminide from Part D in 200 ml. of methanol was shaken over 2 g. of 10% palladium on carbon under 40 lbs. of hydrogen pressure for 17 hours. The catalyst was removed by filtration and the solution concentrated under vacuum. The residue was dissolved in a mixture of 20 ml. of acetone and 20 ml. of water and acidified with 6 N hydrochloric acid. Dilution with 4 volumes of acetone precipitated methyl N-(4-butyl-L-prolyl)-α-thiolincosaminide hydrochloride which was collected by filtration and dried. The crystals, dried at 55° C. under vacuum, weighed 4.7 g. and melted at 188–194° C. The analytical sample obtained by recrystallization from acetone melted at 197–199° C. and gave $[\alpha]_D +150°$ (water, c.=0.89).

*Analysis.*—Calcd. for $C_{18}H_{34}N_2O_6S \cdot HCl$: C, 48.80; H, 7.96; N, 6.32; S, 7.24. Found (corrected for 5.54% water): C, 48.58; H, 8.19; N, 6.04; S, 7.36.

This material possesses 8% of the antibacterial activity of lincomycin by S. *lutea* assay.

(E-2) Methyl N-(4-pentyl-L-prolyl)-α-thiolincosaminide hydrochloride: Hydrogenolysis of methyl N-(4-pentyl-1-carbobenzoxy-L-prolyl)-α-thiolincosaminide by the procedure of Part E-1 gave methyl N-(4-pentyl-L-prolyl)-α-thiolincosaminide hydrochloride having a melting point of 212–214° C., an optical rotation of $[\alpha]_D +141°$ (c.=0.968, $H_2O$), and the following analysis:

Calcd. for $C_{19}H_{37}N_2O_6SCl$: C, 49.93; H, 8.16; N, 6.13; S, 7.02. Found: C, 50.22; H, 7.96; N, 6.09 S, 7.18 (corrected for 5.43% $H_2O$).

(E-3) Methyl N-(4-hexyl-L-prolyl)-α-thiolincosaminide hydrochloride: Hydrogenolysis of methyl N-(4-hexyl-1-carbobenzoxy-L-prolyl)-α-thiolincosaminide by the procedure of Part E-1 gave methyl N-(4-hexyl-L-prolyl)-α-thiolincosaminide hydrochloride having a melting point of 197–209° C. (dec.) and an optical rotation of $[\alpha]_D +134$ (c.=0.875, $H_2O$).

Calcd. for $C_{20}H_{39}N_2O_6SCl$: C, 50.99; H, 8.35; N, 5.95. Found: C, 50.32; H, 8.07; N, 6.81 (corrected for 5.62% water).

(E-4) Methyl N-(4-octyl-L-prolyl)-α-thiolincosaminide hydrochloride: Hydrogenolysis of methyl N-(4-octyl-1-carbobenzoxy-L-prolyl)-α-thiolincosaminide by the procedure of Part E-1 gave methyl N-(4-octyl-L-prolyl)-α-thiolincosaminide hydrochloride having a melting point of 181–200° C. (dec.), an optical rotation of [α]_D +128 (c.=0.850, H_2O), and the following analysis:

Calcd. for $C_{22}H_{42}N_2O_6S \cdot HCl$: C, 52.94; H, 8.68; N, 5.61; S, 6.43. Found: C, 52.62; H, 8.36; N, 5.61; S, 6.36.

(F) *Methyl N-(4-alkyl-1-methyl-L-prolyl)-α-thiolincosaminide hydrochloride*

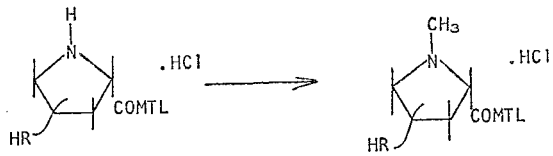

(F–1) Methyl N-(4-butyl-1-methyl-L-prolyl)-α-thiolincosaminide hydrochloride: A solution of 2.0 g. of methyl N-(4-butyl-L-prolyl)-α-thiolincosaminide hydrochloride from Part E and 2.0 ml. of 37% formalin in 150 ml. of methanol was shaken over 500 mg. of 10% palladium on carbon under 40 lbs. of hydrogen pressure for 3.5 hrs. Removal of the catalyst by filtration and the solvent by distillation in vacuo yielded partially crystalline methyl N-(4-butyl-1-methyl-L-prolyl)-α-thiolincosaminide hydrochloride which was found by TLC (thin layer chromatography) on silica gel using a mixture of ethyl acetate, acetone, water (8:4:1) for elution and KMnO_4 solution for detection to consist chiefly of two materials, the cis and trans epimers of methyl N-(4-butyl-1-methyl-L-prolyl)-α-thiolincosaminide hydrochloride in a ratio of about 3 to 2.

*Separation of the cis and trans forms by chromatography.*—The methyl N - (4-butyl-1-methyl-L-prolyl)-α-thiolincosaminide hydrochloride from Part F–1 was dissolved in a mixture of methanol and methylene chloride (1:1) and 1.5 ml. of triethylamine added. To this solution was added 7 g. of silica gel and the solvent evaporated under vacuum leaving the antibiotic deposited on the silica gel which was sifted on top of a chromatographic column of 200 grams of silica gel packed with a solvent mixture consisting of ethyl acetate, acetone, water in a ratio of 8:4:1. The column was developed with the same solvent and 20 ml. portions were collected. TLC of each fraction as described above showed that fractions 31–38, 310 mg., were essentially pure trans epimer and that fractions 49–74, 32 mg., were esentially pure cis epimer. Fractions 39–48 consisted of a mixture of epimers which could be further separated by repeated chromatography. Each epimer was dissolved in a few drops of dilute hydrochloric acid and the hydrochloride precipitated by addition of acetone. In this manner, there was obtained 50 mg. of methyl N-(trans-4-butyl-1-methyl-L-prolyl)-α-thiolincosaminide hydrochloride, M.P. 135–137°, and about 150 mg. of methyl N-(cis-4-butyl-1-methyl-L-prolyl)-α-thiolincosaminide hydrochloride softening at 105° C. with further melting at 175–185° C.

The trans epimer recrystallized from the same solvent melted at 139–141° C. and had the following analysis:

Calcd. for $C_{19}H_{36}N_2O_6S \cdot HCl$: C, 49.93; H, 8.16; N, 6.13; S, 7.02. Found (corrected for 4.07% H_2O): C, 48.81; H, 8.54; N, 6.49; S, 6.67.

Similarly recrystallization of the cis epimer gave a product, softening at 108° C. and further melting at about 189° C. (solvated) which had the following analysis:

Found (corrected for 4.95% water): C, 50.27; H, 9.00; N, 6.05; S, 6.65.

The trans epimer was about 2.2 times as active as lincomycin by *S. lutea* assay, about 2 times as active by the broth dilution assay, and 2.5 times as active in mice infected with *S. aureus*.

The cis epimer was about ½ to ⅓ as active as the trans epimer, being about equal to lincomycin.

(F–2) Methyl N - (pentyl-1-methyl-L-prolyl)-α-thiolincosaminide hydrochloride: Reductive methylation of methyl N-(4-pentyl-L-prolyl)-α-thiolincosaminide hydrochloride by the procedure of Part F–1 gave methyl N-(4-pentyl-1-methyl-L-prolyl)-α-thiolincosaminide hydrochloride as a mixture of the cis and trans isomers which on partition chromatography by the procedure of Part F–1 gave methyl N-(trans-4-pentyl-1-methyl-L-prolyl)-α-thiolincosaminide hydrochloride having a melting point of 188–191° C., and methyl N - (cis-4-pentyl-1-methyl-L-prolyl)-α-thiolincosaminide hydrochloride having a melting point of 189–193° C. (sinter 135° C.). The trans isomer assayed about 2 to 4 times the antibacterial activity of lincomycin, the cis isomer about 1 to 2 times.

(F–3) Methyl N-(4-hexyl-1-methyl-L-prolyl)-α-thiolincosaminide hydrochloride: Reductive methylation of methyl N-(4-hexyl-L-prolyl)-α-thiolincosaminide hydrochloride and chromatographic separation of the isomers by the procedure of Part F–1 gave methyl N-(trans-4-hexyl-L-prolyl)-α-thiolincosaminide hydrochloride having a melting point of 93–104° C. (dec.) and methyl N - (cis-4-hexyl-L-prolyl)-α-thiolincosaminide hydrochloride having a melting point of 92–102° C. (dec.). The trans isomer assayed about 2 to 4 times the antibacterial activity of lincomycin, the cis isomer about 1 to 2 times.

(F–4) Methyl N-(4-octyl-1-methyl-L-prolyl)-α-thiolincosaminide hydrochloride: Reductive methylation of methyl N-(4-octyl-L-prolyl)-α-thiolincosaminide hydrochloride and chromatographic separation of the isomers by the procedure of Part F–1 gave methyl N-(trans-4-octyl - 1-methyl-L-prolyl)-α-thiolincosaminide hydrochloride having a melting point of 97–100° C. (dec.) and methyl N - (cis-4-octyl-1-methyl-L-prolyl)-α-thiolincosaminide hydrochloride.

(G) *Methyl N-(4-alkyl-1-ethyl-L-prolyl)-α-thiolincosaminide hydrochloride*

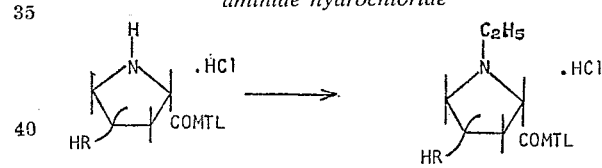

(G–1) Methyl N-(4-butyl - 1 - ethyl-L-prolyl)-α-thiolincosaminide hydrochloride: A mixture of 2.0 g. of methyl N-(4-butyl-L-prolyl)-α-thiolincosaminide hydrochloride 1.5 ml. of acetaldehyde, and 150 mg. of 10% palladium on carbon in 150 ml. of methanol was shaken under 35 lbs. of hydrogen pressure for 5.5 hrs. The catalyst was removed by filtration to give a residue consisting chiefly of the cis and trans epimers of methyl N-(4-butyl-1-ethyl-L-prolyl) - α - thiolincosaminide hydrochloride.

*Separation of epimers.*—As described in Part F–1, the mixture of epimers of Part G–1 (2 g. was chromatographed over 200 g. of silica gel using for elution a solvent system of ethyl acetate, acetone, water (8:4:1). Fractions 33–42 which by TLC were found to be pure trans epimer were combined, and fractions 49–64 which were essentially pure cis epimer were also combined. Fractions 43–48 were a mixture of the epimers which could be purified by rechromatography. Each epimer was dissolved in a few crops of dilute hydrochloride acid and the crystalline hydrochloride precipitated on dilution with a large volume of ether.

The crude trans epimer fraction of 415 mg. gave 340 mg. (15.4%) of crystalline methyl N-(trans-4-butyl-1-ethyl-L-prolyl)-α-thiolincosaminide hydrochloride, M.P. 144–151° C. Recrystallization from dilute acetone raised the M.P. to 148–151° C.

The cis epimer fraction of 645 mg. afforded 300 mg. (14.1%) of crystalline methyl N-(cis-4-butyl-1-ethyl-L-prolyl)-α-thiolincosaminide hydrochloride, M.P. 135–139° C. When recrystallized from dilute acetone, the melting point was 134–138° C.

The trans epimer showed about 1–1.2 times the activity of lincomycin by the *S. lutea* assay, 2–4 times the activity of lincomycin against gram-positive organisms, and 8 times or more the activity of lincomycin against gram-negative organisms. In mice against *S. aureus* the trans epimer was about 2 times as active as lincomycin. The cis epimer was about ½ as active as the trans epimer.

(G–2) Methyl N-(4-pentyl-1-ethyl-L-prolyl) - α - thiolcosaminide hydrochloride: Reductive ethylation and separation by the procedure of Part G–1 gave the cis and trans epimers as the free bases and hydrochlorides. The solvated trans hydrochloride (crystallized from aqueous acetone) had a melting point of 90–95° C. (dec.).

(G–3) Methyl N-(4-hexyl-1-ethyl-L-prolyl) - α - thiolincosaminide hydrochloride: Reductive ethylation and separation by the procedure of Part G–1 gave the cis and trans epimers as the free bases and the hydrochlorides. The trans hydrochloride had a melting point of 102–121° C. (dec.) and the cis hydrochloride a melting point of 93–106° C. (dec.).

(G–4) Methyl N-(4-octyl-1-ethyl-L-prolyl) - α - thiolincosaminide hydrochloride: Reduction ethylation and separation by the procedure of Part G–1 gave the cis and trans epimers as the free bases and the hydrochlorides. The hydrochlorides were solids but non-crystalline.

By substituting the alkyltriphenyl phosphonium bromides of Part A in the above example by other substituted triphenylphosphonium bromides where the substituent is methyl, ethyl, propyl, heptyl, nonyl, decyl, undecyl, and dodecyl, and the isomeric forms thereof, as well as the isomeric forms of butyl, pentyl, and hexyl, cyclopropyl, cyclobutyl, cyclopentyl, cyclohexyl, cycloheptyl, cyclooctyl, 2-cyclopropylethyl, 3-cyclohexylproplyl, benzyl, phenethyl, 3-phenylpropyl, and 1-naphthylmethyl, the corresponding methyl N-(cis- and trans-4-alkyl-, 4-cycloalkyl-, and 4-aralkyl-1-carbobenzoxy-L-prolyl)-α-thiolincosaminides, the corresponding methyl N-(cis and trans-4 - alkyl-, 4 - cycloalkyl-, and 4-aralkyl-L-prolyl)-α-thiolincosaminides; the corresponding methyl N-(cis- and trans-4-alkyl-, 4-cycloalkyl-, and 4-aralkyl-1-methyl-L-propyl)-α-thiolincosaminides and the corresponding methyl N-(cis and trans-4-alkyl-, 4-cycloalkyl-, and 4-aralkyl-1-ethyl-L-prolyl)-α-thiolincosaminides are obtained. For example, when propyltriphenylphosphonium bromide and formalin are used lincomycin and allolincomycin (the cis-epimer) are obtained both of which are active antibiotics. By substituting the formalin or acetaldehyde by other oxo compounds of the formula R₈R₉CO, for example, propionaldehyde, acetone, butyraldehyde, isobutyl methyl ketone, benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3 - cyclopentanepropionaldehyde, cyclohexaneacetaldehyde, cycloheptanecarboxaldehyde, 2,2-dimethylcyclopropaneacetaldehyde, 2,2 - dimethylcyclopropyl methyl ketone, cyclopentyl mehyl ketone, cyclobutyl methyl ketone, cyclobutanone, cyclohexanone, and 4-methylcyclohexanone, the corresponding methyl N-(cis and trans-4-alkyl-, 4 - cycloalkyl-, and 4 - aralkyl-1-R₈R₉CH-L-prolyl)-α-thiolincosaminides where R₈R₉CH— is propyl, isopropyl, butyl, 4-methyl-2-pentyl, benzyl, phenethyl, 3-phenylpropyl, 1-phenylethyl, 1-phenylpropyl, 1-phenylbutyl, 3-methyl-4-phenyl-2-butyl, 2 - methyl-5-phenyl-3-pentyl, 3-cyclopentylpropyl, 2-cyclohexylethyl, cycloheptylmethyl, 2-(2,2-dimethylcyclopropyl)ethyl, 1-(2,2-dimethylcyclopropyl)ethyl, 1-cyclopentylethyl, 1- cyclobutylethyl, cyclobutyl, cyclohexyl, and 4-methylcyclohexyl are obtained. For example, when ethyltriphenylphosphonium bromide and acetaldehyde are used, the antibiotically active methyl 6-(trans-4-ethyl-L-2-pyrrolidinecarboxamido) - 6,8 - dideoxy-1-thio-D-erythro-α-D-galacto-octopyranoside, methyl 6-(trans - 4 - ethyl-1-ethyl-L-2-pyrrolidinecarboxamido)-6,8-dideoxy-1-thio - D-erythro-α-D-galacto-octopyranoside and the cis forms thereof are obtained.

By substituting the methyl α-thiolincosaminide by other α-thiolincosaminides or by β-thiolincosaminides or generally by other 6,8-dideoxy-6-amino-D-erythro- and L-threo-D-galacto-octopyranose compounds of Formula III, examples of which are given hereinafter, the corresponding amides of Formulas IV and V are obtained.

EXAMPLE 2.—PREPARATION OF ALLOLINCOMYCIN (A) *4-propylidene-1-carbobenzoxy-L-proline*

Sodium hydride (3.8 g.) was warmed with 75 ml. of dimethyl sulfoxide at a temperature of 70–75° C. until the reaction was complete. After cooling to 20° C., 30.8 g. of propyltriphenylphosphonium bromide was added, and the resulting red solution was stirred for 30 minutes to insure complete reaction. A solution of 5.2 g. of 4-keto-1-carbobenzoxy-L-proline in 15 ml. of dimethyl sulfoxide was added over a period of 15 minutes, and the resulting mixture was stirred for 20 minutes at 26° C. and then at 70° C. for 4 hours. The reaction mixture was cooled, 100 ml. of 5% aqueous potassium bicarbonate and 100 ml. of water added, and filtered. The filtrate was washed twice with 150 ml. portions of ether and the ether was discarded after back extracting with bicarbonate. The bicarbonate solutions were combined, diluted with 200 ml. of water, and acidified with 4 N hydrochloric acid. The acidified mixture was extracted with three 200-ml. portions of ether. The combined ether extracts were washed with three 50-ml. portions of saturated aqueous sodium bisulfite, then with water and dried over anhydrous sodium sulfate. Evaporation of the solvent gave 5.7 g. of a solid residue which was 4-propylidene-1-carbobenzoxy-L-proline.

This residue was dissolved in 18 ml. of acetonitrile and treated with 2.8 ml. of dicyclohexylamine. The crystalline dicyclohexylamine salt, 5.2 g. (55% yield), melted at 154–157° C After three recrystallizations from acetonitrile, an analytical sample was obtained which melted at 164–166° C. and had a rotation of $[\alpha]_D$ —8° (c.=0.3898, $CHCl_3$).

Calcd. for $C_{28}H_{42}N_2O_4$: C, 71.45; H, 9.00; N, 5.95. Found: C, 71.77; H, 9.39; N, 5.1.

Eight grams (17 mmoles) of the dicyclohexylamine salt of 4 - propylidene - 1 - carbobenzoxy - L - proline was shaken with excess 1.5 N sodium hydroxide solution and ether until solution was complete. The layers were separated and each one was backwashed. The aqueous alkaline layer was combined with the backwash from the ether layer and acidified with 4 N hydrochloric acid. The mixture was extracted with ether and the ether extracts were combined and evaporated to give 4.8 g. (97.8%) of 4-propylidene-1-carbobenzoxy-L-proline as an oil.

(B) *Methyl N-(4-propylidene-1-carbobenzoxy-L-prolyl-α-thiolincosaminide*

To a solution of 2.25 g. of 4-propylidene-1-carbobenzoxy-L-proline from Part A and 1.40 ml. of triethylamine in 80 ml. of distilled acetonitrile cooled to 0° there was added 1.08 ml. of isobutyl chloroformate in 1 ml. of acetonitrile. The mixture was stirred at 0° (±5°) for 15 min. A solution of 2.92 g. of methyl α-thiolincosaminide (MTL) in 100 ml. of water was added rapidly. The resulting solution was stirred at 0° for 1 hr., the cooling bath removed and stirring continued for another hour. The acetonitrile was removed by distillation under vacuum, leaving a partially crystalline residue. The mixture was cooled to 10° and filtered and the product was dried at 55° under vacuum to yield 2.3 g. of crystalline methyl N - (4 - propylidene - 1 - carbobenzoxy - L - prolyl) - α- thiolincosaminide, M.P. 178–186° C. Two recrystallizations from moist ethyl acetate afforded an analytical sample, M.P. 180–187° C., $[\alpha]_D$ +137° (MeOH, c.=0.92).

Calcd. for $C_{25}H_{36}N_2O_8S$: C, 57.23; H, 6.92; N, 5.32; S, 6.11. Found: C, 57.24; H, 7.22; N, 5.18; S, 6.16.

(C) *Methyl 4-(4-propyl-L-prolyl)-α-thiolincosaminide hydrochloride*

A solution of 100 mg. of methyl N-(4-propylidene-1-carbobenzoxy-L-prolyl)-α-thiolincosaminide from Part C in 50 ml. of methanol was shaken over 100 mg. of 7% platinum on Dowex–1 under 40 lbs. of hydrogen pressure for 3 hours. There was then added 100 mg. of 10% palladium on charcoal and the reaction mixture was shaken under 40 lbs. pressure for another 3 hours. The catalyst was removed by filtration and the solvent was removed under vacuum. The residue was dissolved in 0.1 ml. of 0.5 N hydrochloric acid. Dilution with 15.0 ml. of acetone precipitated methyl N-(4-propyl-L-prolyl)-α-thiolincosaminide hydrochloride which was collected by filtration. The crystals, dried at 55° C. under vacuum, weighed 20 mg. and melted at 181–188° C. The product contained about 4 parts of the cis isomer for each part of the trans isomer.

(D) *Methyl N-(4-propyl-1-methyl-L-prolyl)-α-thiolincosaminide hydrochloride*

A solution of 100 mg. of methyl N-(4-propyl-L-prolyl)-α-thiolincosaminide hydrochloride from Part C and 0.2 ml. of formalin in 50 ml. of methanol was shaken over 100 mg. of 10% palladium on carbon under 40 lbs. of hydrogen pressure for 5 hours. The catalyst was removed by filtration and the solvent was removed in vacuo. The residue showed 2 spots on TLC (thin layer chromatography), one being lincomycin hydrochloride, the other being allolincomycin hydrochloride.

(E) *Separation of the cis and trans forms by chromatography*

One gram of methyl N-(4-propyl-1-methyl-L-prolyl)-α-thiolincosaminide hydrochloride from Part D is dissolved in 15–20 ml. of methylene chloride containing 0.5 ml. of triethylamine and 2 g. of silica gel for chromatography added. The solvent is evaporated under vacuum leaving the antibiotic deposited on the free-flowing silica gel. One hundred grams of silica gel is slurried with 80% aqueous acetone and poured in a chromatographic column. The solvent is drained down to the level of the gel. The sample of compound deposited on silica gel is dusted on top of the column followed by a layer of sand. The column is eluted with 80% aqueous acetone and fractions of 20 ml. are collected. A sample of each is assayed by TLC on silica gel using 80% aqueous acetone as the eluting solvent. The antibiotic is detected by spraying with alkaline permanganate solution. The fractions containing the desired products are combined, evaporated to dryness, and the antibiotic crystallized as the hydrochloride by dissolving in excess dilute hydrochloric acid and diluting with acetone. The trans isomer is eluted first followed by a mixture of cis and trans isomers and finally pure cis isomer. The mixture may be rechromatographed as above. The cis isomer, allolincomycin hydrochloride had a melting point of 147–150° C., an $[\alpha]_D$ +110 ($H_2O$), and the following elemental analysis:

Calculated for $C_{18}H_{34}N_2O_6S \cdot HCl$: C, 48.80; H, 7.96; N, 6.32. Found (corrected for 9.47% $H_2O$): C, 49.15; H, 7.80; N, 6.39.

By substituting the propyltriphenylphosphonium bromide of Part A in the above example by other substituted triphenylphosphonium bromides where the substituent is butyl, pentyl, hexyl, heptyl, octyl, nonyl, decyl, undecyl, and dodecyl and the isomeric forms thereof as well as methyl, ethyl, and isopropyl, cyclopropyl, cyclobutyl, cyclopentyl, cyclohexyl, cycloheptyl, cyclooctyl, 2-cyclopropylethyl, 3-cyclohexylpropyl, benzyl, phenethyl, 3-phenylpropyl, an α-naphthylmethyl, the corresponding methyl N-(cis and trans-4-alkylidene, cycloalkylidene-, and aralkylidene-1-carbobenzoxy-L-prolyl)-α-thiolincosaminides, the corresponding methyl N-(cis and trans-4-alkyl, cycloalkyl-, and aralkyl-L-prolyl)-α-thiolincosaminides and the corresponding N-(cis and trans-4-alkyl-, cycloalkyl-, and aralkyl-1-methyl-L-prolyl)-α-thiolincosaminides are obtained. By substituting the formalin of Part D by other oxo compounds of the formula $R_8R_9CO$, for example, acetaldehyde, propionaldehyde, acetone, butyraldehyde, isobutyl methyl ketone (4-methyl-2-pentanone), benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3 - cyclopentanepropionaldehyde, cyclohexaneacetaldehyde, cycloheptanecarboxaldehyde, 2,2-dimethylcyclopropaneacetaldehyde, 2,2-dimethylcyclopropyl methyl ketone, cyclopentyl methyl ketone, cyclobutyl methyl ketone, cyclobutanone, cyclohexanone, and 4-methylcyclohexanone, the corresponding methyl N-(cis and trans-4-alkyl-, 4-cycloalkyl-, and 4-aralkyl-1-$R_8R_9$CH-L-prolyl)-α-thiolincosaminides where $R_8R_9$CH— is ethyl, propyl, isopropyl, butyl, 4-methyl-2-pentyl, benzyl, phenethyl, 3-phenylpropyl, 1-phenylethyl, 1 - phenylpropyl, 1-phenylbutyl, 3-methyl-4-phenyl-2-butyl, 2-methyl-5-phenyl-3-pentyl, 3-cyclopentylpropyl, 2-cyclohexylethyl, cycloheptylmethyl, 2-(2,2-dimethylcyclopropyl)ethyl, 1-(2,2-dimethylcyclopropyl)ethyl, 1-cyclopentylethyl, 1-cyclobutylethyl, cyclobutyl, cyclohexyl, and 4-methylcyclohexyl are obtained.

By substituting the methyl α-thiolincosaminide by other α-thiolincosaminides or by β-thiolincosaminides or generally by other 6,8-dideoxy-6-amino-D-erythro-D-galacto-octopyranose compounds of Formula III, examples of which are given hereinafter, the corresponding amides of Formulas IV and V are obtained.

EXAMPLE 3.—ETHYL α-THIOLINCOSAMINIDE

Lincomycin C hydrochloride (2 g.) was dissolved in 50 ml. of water. The pH of the solution was adjusted to 9.5 by the addition of an anion exchange resin in the hydroxide form. (An anion exchange resin obtained by chloromethylating by the procedure given on pp. 88 and 97 of Kunin, Ion Exchange Resins, 2nd ed. (1958), John Wiley and Sons, Inc., polystyrene cross-linked, if desired, with divinylbenzene, prepared by the procedure given on p. 84 of Kunin, supra, and quaternizing with trimethylamine or dimethylethanolamine by the procedure given on p. 97 of Kunin, supra.) The alkaline solution was then freeze-dried to a residue which was dissolved in 50 ml. of hydrazine hydrate (98–100%) and refluxed for 24 hours. The solution was then concentrated to dryness in vacuo and the residue triturated three times with 10 ml. portions of acetonitrile. The insoluble material was collected and dried; yield 900 mg. A solution of 600 mg. of the dried insoluble material in 4 ml. of dimethylformamide (heat was used to promote solution) was then clarified by filtration and the filtrate was held at room temperature for 4 hours. The crystalline ethyl α-thiolincosaminide which precipitated was isolated by filtration, washed with ether and dried; yield 500 mg.

Ethyl α-thiolincosaminide has the following physical and chemical characteristics: Melting point: 191–195° C.; Optical rotation: $[\alpha]_D^{25}+258°$ (c., 0.76 in water); and Titration: pKa'=7.17, and the following elemental analysis: Calculated for $C_{10}H_{21}NO_5S$: C, 44.93; H, 7.92; N, 5.24; S, 11.99; O, 29.92. Found: C, 44.09; H, 7.91; N, 5.24, S, 11.32.

The lincomycin C hydrochloride was prepared as follows:

FERMENTATION

A soil slant of *Streptomyces lincolnensis* var. *lincolnensis*, NRRL 2936, was used to inoculate a series of 500-ml. Erlenmeyer flasks each containing 100 ml. of seed medium consisting of the following ingredients:

| | G. |
|---|---|
| Yeastolac [1] | 10 |
| Glucose monohydrate | 10 |
| N-Z-amine B [2] | 5 |
| Tap water q.s. (1 liter). | |

[1] Yeastolac is a protein hydrolysate of yeast cells.
[2] N-Z-amine B is Sheffield's enzymatic digest casein.

The seed medium presterilization pH was 7.3. The seed was grown for 2 days at 28° C. on a Gump rotary shaker operating at 250 r.p.m.

A 5% inoculum of seed described above (5 ml.) was added to each of 30 500-ml. Erlenmyer flasks each containing 100 ml. of the following fermentation medium:

| | | |
|---|---|---|
| Glucose monohydrate | g | 15 |
| Starch | g | 40 |
| Molasses | g | 20 |
| Wilson's Penton Liquor No. 159 [1] | g | 10 |
| Corn steep liquor | g | 20 |
| Calcium carbonate | g | 8 |
| Lard oil | ml | 0.5 |
| Tap water q.s., (1 liter.) | | |

[1] Wilson's Peptone Liquor No. 159 is a preparation of enzymatically hydrolyzed proteins from animal origin.

At the time of inoculation, DL-ethionine was added to a final concentration of 2 mg./ml.

The shake flasks were havested after 4 days of fermentation at 28° C. on a Gump rotary shaker at 250 r.p.m. They assayed 200 mcg./ml. on the S lutea assay, hereinafter described. The whole beer solids was about 20 gm./liter.

PURIFICATION

Whole beer (235 liters) from a DL-ethionine fermentation was filtered at harvest pH using a filter aid as required. The mycelial cake was washed with water and the cake was then discarded. The filtered beer and water wash (275 liters) was stirred for 45 minutes with 12.5 kg. of activated carbon and 2.5 kg. of diatomaceous earth. The mixture was filtered and the filtrate was discarded. The carbon cake was washed with 60 liters of water and the water wash was discarded. The cake as washed with 70 liters of 20% aqueous acetone and the 20% aqueous acetone wash was described. The cake was then eluted twice with 100 liter portions of 90% aqueous acetone. The eluates were combined (215 liters) and the solution was concentrated (18 liters). This concentrate was adjusted to pH 10.0 with a 50% aqeous sodium hydroxide solution and extracted three times with 20 liter portions of methylene chloride. The methylene chloride extracts were combined (60 liters) and then concentrated to give an oily preparation (7.14 g.) containing lincomycin and lincomycin C in equal amounts and both in the free base form. This preparation was then dissolved in 200 ml. of methylene chloride. The solution was clarified by filtration and then concentrated to dryness in vacuo. The residue was dissolved in 100 ml. of 1 N methanolic hydrogen chloride. The methanolic solution was then mixed with 3.2 liters of ether under stirring. The resulting precipitated colorless, crude lincomycin hydrochloride and lincomycin C hydrochloride was isolated by filtration and dried; yield 7.14 g. assaying 940 mcg./mg. against *Sarcina lutea*. (The assay against *Sarcina lutea* is conducted on agar buffered to pH 6–8 with pH 7.0 phosphate buffer [0.1 M]. A unit volume [0.08 ml.] of solution containing the material to be assayed is placed on a 12.7 ml. assay disc which is then placed on an agar plate seeded with the assay microorganism.) Thin layer chromatography showed the presence of both lincomycin hydrochloride and lincomycin C hydrochloride in approximately equal amounts.

Crude lincompcin C hydrochloride (7.0 g.) was dissolved in 20 ml. of water and 20 ml. of butanol, pH adjusted to 4.2 with 1 N HCl, and the solution distributed in a counter current distribution apparatus for 1000 transfers. Analysis by tin-layer chromatography showed that the fractions in tubes 135 to 190 contained lincomycin C. These fractions were combined, and the solution was concentrated to an aqueous and freeze dried to give 2.44 g. of lincomycin C hydrochloride assaying 1400 mcg./mg. against *Sarcina lutea*. Five hundred mg. of this preparation was dissolved in 2 ml. of water, 1 ml. of methanol, and 100 ml. of acetone. The solution was clarified by filtration. The filtrate was mixed with ether until crystals appeared. The mixture was allowed to stand at room temperature for 1 hr. Crystalline (cubes) lincomycin C hydrochloride was separated from the supernatant material solution by decantation. These crystals were recrystallized from one ml. of water, one ml. of methanol, 80 ml. of acetone and 20 ml. of ether; yield, 250 mg. of crystalline (cubes) lincomycin C hydrochloride. The supernatant (obtained as described above) was allowed to stand at 5° C. for 4 hours. Crystalline (needles) lincomycin C hydrochloride which precipitated was filtrated and dried; yield, 150 mg. of crystalline (needles) lincomycin C hydrochloride, M.P. 151–157° C.

Following the procedure of Example 1 substituting the methyl α-thiolincosaminide by ethyl α-thiolincosaminide, compounds of Formulas IV and V wherein R, $R_1$ and Z are as given about and Y is $—SCH_2CH_3$ in the α-configuration are obtained. For example, when alkyltriphenylphosphonium bromide and formalin or acetaldehyde are used antibiotically active ethyl 6-(trans-substituted-L-2-pyrrolidinecarboxamido)-6,8-dideoxy-1-thio - D-erythro-α-D-galacto-octopyranosides and the cis forms thereof are obtained where the substituents are 4-alkyl, 4-alkyl-1-methyl, and 4-alkyl-1-ethyl where, alkyl can be ethyl, propyl, butyl, pentyl, and hexyl, or the isomeric forms thereof.

EXAMPLE 4.—ALKYL β-THIOLINCOSAMINIDES

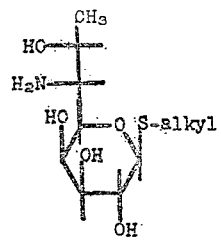

XXXV (A) *Methyl N-acetyl-α-thiolincosaminide*

Five grams of methyl α-thiolincosaminide (about 0.02 mole) was suspended with stirring in 50 ml. of methanol and treated with 4.04 g. (about 0.04 mole) of acetic anhydride. The starting material dissolved almost completely, and thereafter the mixture became solid. After 18 hours at room temperature (about 25° C.), the solid was filtered, washed with methanol, and dried in a vacuum oven at 50° C. and 15 mm. pressure; yield, 4.58 g. (79%) of crystaliine product melting at 242–245° C. This product was recrystallized from absolute methanol to give colorless needles of methyl N-acetyl-α-thiolincosaminide having a melting point of 243–245° C. and a rotation of $[\alpha]_D^{25}$ +265° (c. 0.7374, water).

*Analysis.*—Calcd. for $C_{11}H_{21}NO_6S$: C, 44.72; H, 7.17; N, 4.74; S, 10.85. Found: C, 44.87; H, 7.10; N, 4.65; S, 10.99.

(B) *Mixture of 6-acetamido - 6,8 - dideoxy-D-erythro-α- and β-D-galacto-octopyranoses (N-acetyl-α- and β-lincosamines)*

A solution of 50 g. of methyl N-acetyl-α-thiolincosaminide of part A in 1500 ml. of water at 40° C. was stirred magnetically and treated with a solution of 70 g. of mercuric chloride in 1500 ml. of water at 40° C.; a white precipitate formed immediately. The reaction was continued with occasional heating to 40° C. for a period of 3 days. Thin-layer chromatography then showed the absence of starting material. The precipitate of mercuric chloride mercaptide (ClHgSMe) was removed by filtration. The colorless filtrate, together with aqueous washes of the precipitate, was stirred magnetically at room temperature, and the excess of mercuric chloride was removed by the addition of pyridine in small portions until the precipitation of the insoluble mercuric chloride-pyridine complex was complete. After storing the mixture in the refrigerator at 0° C. for 3 hours, the solid was removed by filtration, the precipitate was washed well with cold water, and the combined filtrate and washings were stirred with a small amount of silver carbonate until the solution was neutral to pH paper. The solution was thereupon filtered through a "Millipore" filter (Millipore Filter Corporation, Bedford, Mass.), the filter was washed thoroughly with water, and the washings were added to the colorless filtrate. Excess silver ion was precipitated by saturating the solution with hydrogen sulfide and removing the silver sulfide by filtration. The silver sulfide was washed with water, the washings were added to the filtrate, and the solution was lyophilized to give a colorless amorphous solid, which was a mixture of 6-acetamido-6,8-dideoxy-D-erythro-α- and β-D-galacto-octopyranoses (N-acetyl-α-lincosamine and N-acetyl-β-lincosamine).

(C) *N-acetyl-1,2,3,4,7-penta-O-acetyl-β-lincosamine*

The crude mixture of N-acetyl-α-lincosamine and N-acetyl-O-lincosamine of part B was slurried in 400 ml. of pyridine and 200 ml. of acetic anhydride and stirred magnetically overnight at room temperature. The resulting colorless solution was concentrated on a rotating evaporator at 40° C. and 1 mm. Hg pressure to a pale yellow syrup which was dissolved in a mixture of water and chloroform. The aqueous layer was extracted with chloroform and the chloroform extracts were combined, washed with dilute sulfuric acid (2 N), then twice with water, with saturated aqueous sodium bicarbonate, with water until neutral, and finally dried over anhydrous sodium sulfate. The resulting chloroform extract was then evaporated on a rotating evaporator at 35° C. and 15 mm. Hg pressure to give a colorless solid which was dissolved in hot ethyl acetate. To this ethyl acetate solution was added Skellysolve B hexanes until a solid began to crystallize. The solid was removed by filtration and twice recrystallized from ethyl acetate-Skellysolve B hexanes to give N-acetyl-1,2,3,4,7-penta-O-acetyl-β-lincosamine (9.27 g.) of melting point 227–230° C. and rotation $[\alpha]_D^{25}$ +33° (c. 0.832, chloroform).

*Analysis.*—Calcd. for $C_{20}H_{29}NO_{12}$: C, 50.52; H, 6.15; N, 2.95. Found: C, 50.40; H, 6.42; N, 3.04.

The ethyl acetate-Skellysolve B hexanes filtrate from the first crystallization was allowed to stand at room temperature, whereupon colorless prismatic needles of N-acetyl - 1,2,3,4,7-penta-O-acetyl-α-lincosamine separated; M.P. 169–172° C. The melt resolidified on cooling in the form of hexagonal platelets which then melted at 237–238° C.; after recrystallization from ethyl acetate-Skellysolve B hexagonal platelets were obtained melting at 240– 240.5° C. and having a rotation of $[\alpha]_D^{25}$ +132° (c. 0.9842, chloroform).

*Analysis.*—Calcd. for $C_{20}H_{29}NO_{12}$: C, 50.52; H, 6.15; N, 2.95. Found: C, 50.62; H, 6.08; N, 3.02.

The N-acetyl-1,2,3,4,7-penta-O-acetyl-α- and β-lincosamines can also be separated by counter current distribution, using a system of water:acetone:methyl ethyl ketone:cyclohexane in a volume ratio of 3:5:4:4. In 900 transfers, approximately 50% of each of the 2 anomers could be isolated in the pure state, the partition coefficients being for the α-anomer, 0.75; for the β-anomer, 0.66.

(D) *6 - acetylamino - 2,3,4,7 - tetra - O - acetyl -1- bromo - 1,6,8-trideoxy D-erythro-α-D-galacto-octopyranose (N - acetyl - 2,3,4,7 - tetra - O - acetyl - 1 - bromo-1-deoxy-α-lincosamine)*

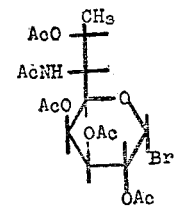

XXXVI

Two grams of N-acetyl-1,2,3,4,7-penta-O-acetyl-β-lincosamine of part C was stirred magnetically with a solution of anhydrous hydrogen bromide in acetic acid in 5 ml of acetic acid (saturated at 0°) at room temperature (about 25° C.) for about 3 hours. All of the solids dissolved within one hour. The pale yellow, viscous solution was diluted with 50 ml. of chloroform, poured onto ice and stirred for 10 minutes. The chloroform layer was separated, the aqueous solution was extracted thoroughly with chloroform, and the combined chloroform extracts were washed with water until the aqueous wash was neutral to Congo red paper, and dried over anhydrous sodium sulfate. The chloroform was thereupon evaporated in a rotatory evaporator at 35° C. and 15 mm. Hg pressure to give an almost colorless amorphous solid. After three crystallizations of the solid from chloroform-Skellysolve B, colorless, prismatic needles of N-acetyl-2,3,4,7-tetra-O-acetyl-1α-bromo-1-dexoylincosamine were obtained which had a melting point of 188–189° C. and a rotation of $[\alpha]_D^{25}$ +231° (c. 0.8132, chloroform).

*Analysis.*—Calcd. for $C_{18}H_{26}BrNO_{10}$: C, 43.56; H, 5.28; N, 2.82; Br, 16.10. Found: C, 43.68; H, 5.49; N, 2.88; Br, 17.22.

(E) *Methyl N-acetyl-2,3,4,7-O-acetyl-β thiolincosaminide*

Two grams of N-acetyl-2,3,4,7-tetra-O-acetyl-1α-bromo-1-deoxylincosamine of part D was dissolved in 25 ml. of acetone which had been dried previously over potassium carbonate, and to this solution was added 350 mg. of thiourea. After warming briefly on a steam bath until the solids had dissolved, the colorless reaction mixture was left overnight at room temperature. To it was then added a solution of 680 mg. of potassium carbonate and 860 mg. of sodium bisulfite in 10 ml. of water, followed by 900 mg. (0.40 ml.) of methyl iodide. The mixture was kept in a stoppered bottle which was shaken mechanically at room temperature for 3 hours. The reaction mixture was then extracted thoroughly with chloroform, the combined extracts were washed twice with water, dried over anhydrous sodium sulfate, and the solvents were removed on a rotating evaporator at 40° C. and 15 mm. Hg pressure. In this manner 1.38 g. of colorless, amorphous solid was obtained, which upon thin-layer chromatography was shown to be a single compound. This solid was dissolved in hot ethyl acetate which was thereupon diluted with Skellysolve B hexanes to give 880 mg. of colorless platelets of melting point 268–272° C. Recrystallization from the same solvents gave methyl N-acetyl-2,3,4,7-tetra- O-acetyl-β-thiolincosaminide of melting point 272–273° C. and rotation $[\alpha]_D^{25}$ +31° (c. 0.6800, chloroform).

*Analysis.*—Calcd. for $C_{19}H_{29}NO_{10}S$: C, 49.22; H, 6.31; N, 3.02; S, 6.92. Found: C, 49.15; H, 6.23; N, 3.00; S, 6.41.

(F) *Methyl N-acetyl-β-thiolincosaminide*

Ten ml. of methanol was saturated with dry ammonia gas at a temperature between 0 and 5° C. Into this saturated solution was added at room temperature 1 g. of methyl N - acetyl - 2,3,4,7 - tetra - O - acetyl - β - thiolincosaminide. The mixture was allowed to stand at room temperature for three hours and then taken to dryness on a rotating evaporator at 40° C. and 15 mm. Hg pressure, and the solid thus obtained was recrystallized three times from ethanol to give methyl N-acetyl-β-thiolincosaminide.

(G) *Methyl β-thiolincosaminide*

A solution of 1 g. of methyl N - acetyl - β - thiolincosaminide in 10 ml. of hydrazine hydrate was refluxed for 24 hours. Excess hydrazine was then removed in a stream of dry nitrogen on a steam bath. The crystalline residue was recrystallized from 5 ml. of water, the crystals were collected, washed with cold water, and dried in vacuo to give methyl β-thiolincosaminide.

By substituting the methyl iodide of part E by ethyl, propyl, butyl, pentyl, hexyl, heptyl, octyl, nonyl, decyl, undecyl, and dodecyl iodides and the isomeric forms thereof the corresponding alkyl N-acetyl-1,2,3,4,7-tetra-O-acetyl-β-thiolincosaminides, alkyl N-acetyl-β-thiolincosaminides, and alkyl β-thiolincosaminides are obtained.

Following the procedure of Example 1 compounds of the formula

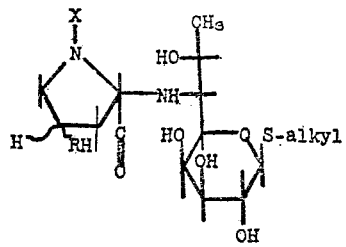

XXXVII wherein X=R₁ or Z as given above and R is as given above are obtained.

By substituting 2-hydroxyethyl iodide for the methyl iodide of Part E, 2-hydroxyethyl N-acetyl-2,3,4,7-tetra-O-acetyl-β-thiolincosaminide, 2-hydroxyethyl N-acetyl-β-thiolincosaminide, and 2-hydroxyethyl β-thiolincosaminide are obtained. By using a 2-alkoxyethyl iodide the corresponding 2-alkoxyethyl compounds are obtained. The alkyl of the alkoxy can be methyl, ethyl, propyl, butyl, pentyl, hexyl, heptyl, octyl, nonyl, decyl, undecyl, or dodecyl or the isomeric forms thereof.

Following the procedures of Example 1, compounds of the formula:

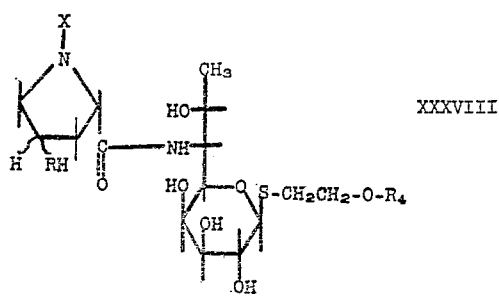

XXXVIII wherein X=R₁ or Z as given above and R is as given above and wherein R₄ is hydrogen or alkyl as given above are obtained.

EXAMPLE 5.—6 - AMINO - 1,6,8 - TRIDEOXY-D-ERYTHRO-D-GALACTO-OCTOPYRANOSE (1-DEOXYLINCOSAMINE)

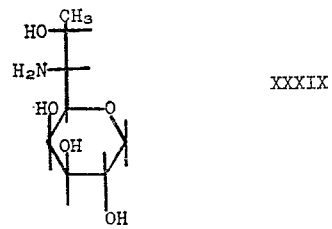

XXXIX (A) *Methyl N-acetyl-3,4-O-isopropylidene-β-thiolincosaminide*

A suspension of 5.3 g. of finely-powdered methyl N-acetyl-β-thiolincosaminide was stirred for 30 minutes at room temperature with 500 ml. of acetone and 5 ml. of concentrated sulfuric acid. After 30 minutes another 5 ml. of concentrated sulfuric acid was added, and the solution was stirred for another half hour at room temperature. A suspension of 150 g. of barium carbonate in 100 ml. of water was added, and the mixture was stirred until neutral. The barium sulfate and excess carbonate were removed by filtration, and the precipitate was washed with acetone. The filtrate and washings were combined and evaporated to dryness in vacuo at 40° C. The residue was treated with acetone:ether (10:1) and insoluble materials were removed by filtration. The filtrate was evaporated to dryness and the residue was dissolved in 100 ml. of ethanol. Removal of the alcohol by heating in vacuo left a gummy material which was dissolved in 20 ml. of warm water containing a small amount of sodium carbonate. After removal of some insoluble material by filtration, the filtrate was cooled. The crystals which formed were collected after standing in the refrigerator for 4 hours, washed with cold water, and dried in vacuo to give methyl N-acetyl-3,4-O-isopropylidene-β-thiolincosaminide.

(B) *N-acetyl-3,4-O-isopropylidene-1-deoxylincosamine*

Five grams of methyl N-acetyl-3,4-O-isopropylidene-β-thiolincosaminide was heated under reflux for 7 hours with 35 ml. of loosely-packed Raney nickel in 150 ml. of ethanol. The mixture was thereupon filtered and the catalyst was washed with a total of 400 ml. of boiling ethanol. The filtrate and washings were combined and evaporated to dryness, leaving a partially crystalline residue. This residue was purified by counter current distribution in a system of butanol:water to give N-acetyl-3,4-O-isopropylidene-1-deoxylincosamine.

(C) *1-deoxylincosamine*

One gram of N-acetyl-3,4-O-isopropylidene-1-deoxylincosamine in 5 ml. of hydrazine hydrate (98–100%) is heated under reflux for 21 hours. The excess hydrazine hydrate is distilled in vacuo. The residue is stirred with acetonitrile and again evaporated. Five ml. of water is added and the pH adjusted to 2 with hydrochloric acid. After 3–5 hrs. at 26° the solution is diluted with 10 ml. of water and excess silver carbonate added. The mixture is then filtered and the filtrate lyophilized. The resulting residue is crystallized from water to yield 1-deoxylincosamine.

Following the procedure of Examle 1, compounds of the formula:

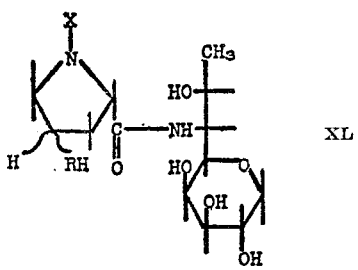

wherein X=R₁ or Z as given above and R is as given above are obtained.

EXAMPLE 6.—2-HYDROXYETHYL 6-AMINO-7-O-METHYL - 6,8 - DIDEOXY-1-THIO-D-ERYTHRO-α-D-GALACTO-OCTOPYRANOSIDE (2-HYDROXY-ETHYL α-THIOCELESTOSAMINIDE)

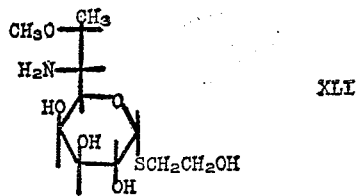

(A) *2-hydroxyethyl α-thiocelestosaminide hydrazine solvate*

A mixture of 5 g. (0.0094 mole) of celesticetin (Example 3, U.S. Patent 2,928,844) and 25 ml. (excess) of hydrazine hydrate was heated under reflux for 21 hours. The excess hydrazine was removed by distillation in vacuo and the residue was crystallized from 35 ml. of absolute ethanol. White crystals (1.2 g.) of 2-hydroxyethyl α-thiocelestosaminide hydrazine solvate were obtained which melted at 98–108° C. Recrystallization from absolute ethanol gave 0.65 g. having an optical rotation of $[\alpha]_D^{25} = +243°$ (c.=0.8, water); an infrared absorption spectrum in Nujol mull at the following frequencies: 3400, 1630, 1600, 1460, 1450 (sh.) 1305, 1275, 1260, 1200, 1115, 1085, 1055, 1010, 978, 950, 925, 910, 873, 800–820, 705, 690, and 680 cm.⁻¹; an equivalent weight of 161 with two basic groups having pKa's in the region of 7.5; and the following elemental analysis:

Calculated for $C_{11}H_{23}NO_6S \cdot N_2H_4$: C, 40.11; H, 8.26; N, 12.76; S, 9.74. Found: C, 40.15; H, 8.04; N, 11.69; S, 9.56.

(B) *2-hydroxyethyl α-thiocelestosaminide hydrazine solvate*

Desalicetin (Example 1, U.S. Patent 2,851,463) (10 g.) was dissolved in hydrazine hydrate (100 cc.) and heated under reflux in an oil bath at 165° C. for 18 hours. The almost colorless solution was concentrated to dryness on a steam bath first at 15 mm. and finally at less than 1 mm., giving a solid residue which was triturated with acetonitrile, filtered, and washed with the same solvent. Crystallization from ethanol gave colorless needles (2.64 g.) of 2-hydroxyethyl α-thiocelestosaminide hydrazine solvate. Recrystallization from the same solvent gave crystals of 2-hydroxyethyl α-thiocelestosaminide hydrazine solvate which had an equivalent weight of 168 with two basic group having pKas in the region of 7.5; an optical rotation of $[\alpha]_D^{25} = +248°$ (c.=1, 95% ethanol); and the following elemental analysis:

Calculated for $C_{11}H_{23}NO_6S \cdot N_2H_4$: C, 40.11; H. 8.26; N, 12.76; S, 9.74. Found: C, 40.27; H, 7.95; N, 11.63; S, 9.80.

(C) *2-hydroxyethyl α-thiocelestosaminide*

A solution of 2 g. of 2-hydroxyethyl α-thiocelestosaminide hydrazine solvate, prepared as in part A or part B, in 30 ml. of dimethylformamide was concentrated to a volume of about 10 ml. and then diluted with 10 ml. of dimethylformamide. Ether was added until cloudiness resulted, and 500 mg. of 2-hydroxyethyl α-thiocelestosaminide was deposited. The crystalline 2-hydroxyethyl α-thiocelestosaminide had an optical rotation of $[\alpha]_D^{25} = +262°$ (c.=1, in water); an infrared absorption spectrum at the following frequencies: 3400 (sh.), 3250, 1600, 1400, 1325, 1310, 1290, 1240, 1195, 1160, 1150 (sh.), 1110, 1100, 1075, 1045, 1038, 1005, 980, 920, 895, 862, 825, 796, 740, 711, and 690 cm.⁻¹; an equivalent weight of 297 and a pKa of 7.2; and the following elemental analysis:

Calculated for $C_{11}H_{23}NO_6S$: C, 44.43; H, 7.80; N, 4.71; S, 10.78. Found: C, 44.20; H, 7.78; N, 4.97; S, 10.68.

Following the procedure of Example 1, compounds of the formula:

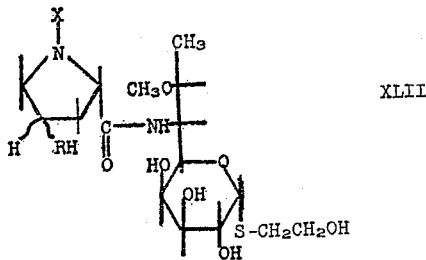

wherein X=R₁ or Z as given above and R is as given above, are obtained.

EXAMPLE 7.—7-O-METHYL-1-DEOXYLINCOSAMINE

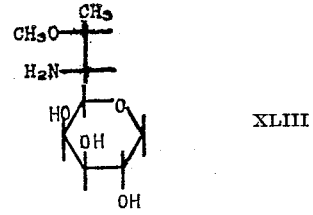

(A) *2-hydroxyethyl N-acetyl-3,4-O-isopropylidene-α-thiocelestosaminide*

To a solution of 14 g. (0.047 mole) of 2-hydroxyethyl α-thiocelestosaminide in 150 ml. of ethanol was added 14 ml. of acetic anhydride. The reaction mixture was stirred for ½ hours, refrigerated overnight, and evaporated to dryness in vacuo. The residue, 2-hydroxyethyl N-acetyl-α-thiocelestosaminide, was slurried with ether and dried under reduced pressure.

The thus-obtained dried material was dissolved in 1500 ml. of acetone and 15 ml. of concentrated sulfuric acid was added to the solution with stirring. The mixture was stirred for about 2 hours and then neutralized by adding dry ammonia. The mixture was filtered and the filtrate was evaporated to dryness, leaving 2-hydroxyethyl N-acetyl-3,4-O-isopropylidene-α-thiocelestosaminide as an oil.

(B–1) N-acetyl - 3,4 - O - isopropylidene - 7 - O-methyl-1-deoxylincosamine: The oil of part A was dissolved in 500 ml. of ethanol, 150 ml. of loosely-packed Raney nickel in ethanol was added thereto, and the mixture was heated under reflux for 10 hours. Thereafter the mixture was filtered, the catalyst was washed with 1 liter of boiling ethanol and the combined filtrate and washings were evaporated to dryness. An oil resulted which was distributed (500 transfers) in the system 1-butanol:water. A peak fraction, K=0.82, obtained by evaporation of pooled tubes 200–250, gave 4.6 g. (33%) of N-acetyl-3,4-O-isopropylidene-7-O-methyl-1-deoxylincosamine which crystallized upon drying; melting point, 198–205° C.; rotation $[\alpha]_D^{25}$ +71° (c.=1, 50% ethanol).

Analysis.—Calcd. for $C_{14}H_{25}NO_6$: C, 55.43; H, 8.31; N, 4.62; methoxyl, 10.63. Found: C, 55.03; H, 8.28; N, 4.70; methoxyl, 10.43.

(B-2): Potassium metal (1.16 g.) was dissolved in 100 ml. of tert-butyl alcohol. The solvent was removed as completely as possible by distillation (unless specified all distillations are at atmospheric pressure) and finally by vacuum distillation at 15 mm. Hg pressure. To the dry solid residue was added 100 ml. of dry benzene and the benzene was removed by distillation to leave a fine powder. To the thus-obtained powdery potassium tert-butoxide was added 200 ml. of dry benzene, and the mixture was stirred magnetically at room temperature until an opalescent solution resulted. To this solution was added 5 g. of N-acetyl-3,4-O-isopropylidene-1-deoxylincosamine, prepared according to part B of Example 5, and the mixture was then stirred overnight at room temperature. To this mixture was added 42.4 g. (18.6 ml.) of methyl iodide and the mixture was stirred at room temperature for 2 hours. The mixture was filtered to remove potassium iodide, and the filtrate was distilled in vacuum at about 35° C. to give a colorless syrupy material which was subjected to counter current distribution in a system of ethyl acetate:ethanol:water in a ratio of 4:1:2. The fractions containing N-acetyl-3,4-O-isopropylidene-7-O-methyl-1-deoxylincosamine, as determined by thin-layer chromatography, were combined, evaporated to dryness and the residue was crytsallized to give pure N-acetyl-3,4-O-isopropylidene-7-O-methyl-1-deoxylincosamine.

(C) *7-O-methyl-1-deoxylincosamine*

Following the procedure of Example 5, part C, N-acetyl - 3,4 - O - isopropylidene - 7 - O - methyl - 1 - deoxylincosamine is converted to 7-O-methyl-1-deoxylincosamine.

Following the procedure of Example 1, compounds of the formula:

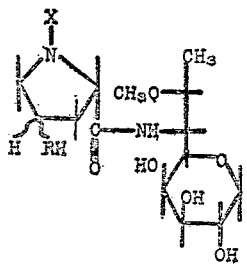

XLIV wherein $X=R_1$ or Z as given above and R is as given above, are obtained.

EXAMPLE 8.—2-HYDROXYETHYL α-THIOLINCOSAMINIDE (A) *Methyl N-acetyl-2,3,4,7-tetra-O-thionobenzoyl-*

Methyl N-acetyl-α-thiolincosaminide (IX), dissolved in dry pyridine, is treated with an excess of thiobenzoyl chloride (180% excess) at 0° C. and the reaction mixture allowed to stand overnight at room temperature with the exclusion of atmospheric moisture. Following the removal as completely as possible of volatile material at 30° C. under high vacuum, the reaction product is extracted with chloroform, the extract washed with water, dilute sulfuric acid (N), water, saturated aqueous sodium bicarbonate, with water again, and dried over anhydrous sodium sulfate. Removal of the chloroform in vacuo yields the product, methyl N-acetyl-2,3,4,7-tetra-O-thionobenzoyl-α-thiolincosaminide (X), which can be recrystallized from acetone or ethyl acetate by the addition of Skellysolve B (technical hexane).

(B) *2-hydroxyethyl N-acetyl-2-O-benzoyl-3,4,6-tri-O-thionobenzoyl-α-thiolincosaminide*

The tetrathionobenzoate (X) of part A is dissolved in ethanol-free chloroform (to give a 2 to 10% solution) and treated with a solution of bromine (2 molecular equivalents) in chloroform (a 1–2% solution, vol./vol.) with magnetic stirring at room temperature with the exclusion of atmospheric moisture. After 2 hours the volatile material is removed as completely as possible by evaporation at 30° C. and 15 mm. Hg pressure, more chloroform (ca. 100 ml. per 2 g. of starting material) is then added and removed as before. To the residue is added acetone (ca. 25 ml. per 2 g. of starting material) and triethylamine (2 molar equivalents), and the resulting solution heated under reflux on a steam bath for 1 hr. with the exclusion of atmospheric moisture. (The initial bromination product (XI), is thus converted to the cyclised intermediate (XII).) To the cooled solution is then added potassium carbonate (5 molecular equivalents), sodium bicarbonate (wt. equal to the potassium carbonate used), and water (ca. 10 ml. per g. of potassium carbonate), followed by ethylene iodohydrin (preferably, ca. 6–10 molecular equivalents), and the stoppered mixture is shaken mechanically for 3 hrs. at room temperature. The reaction mixture is extracted with chloroform and the chloroform solution is washed with water to remove inorganic salts, and dried over anhydrous sodium sulfate. Removal of the chloroform at 30° C. in vacuo yields 2-hydroxylethyl N-acetyl-2-O-benzoyl-3,4,7-tri-O-thionobenzoyl-α-thiolincosaminide (XIV).

(C): The above acylated compound (XIV) is heated under reflux with hydrazine hydrate (20–30 times the weight of the ester) for 12–36 hours and the excess hydrazine is removed by distillation under reduced pressure. The residue is triturated with acetonitrile, and the remaining solid product is recovered by filtration, washed with acetonitrile, and recrystallized from ethanol to yield 2-hydroxyethyl α-thiolincosaminide.

By using a 2-alkoxyethyl iodide the corresponding 2-alkyloxyethyl compounds are obtained. The alkyl of the alkyloxy can be methyl, ethyl, propyl, butyl, pentyl, hexyl, heptyl, octyl, nonyl, decyl, undecyl, or dodecyl or the isomeric forms thereof.

Following the procedure of Example 1, compounds of the formula:

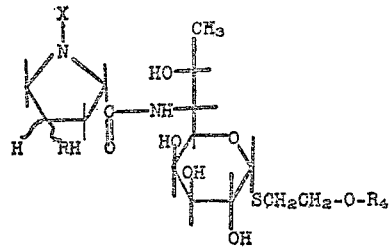

XLV wherein $X=R_1$ or Z as given above and R and $R_4$ are as given above, are obtained.

EXAMPLE 9.—ALKYL α-THIOLINCOSAMINIDES

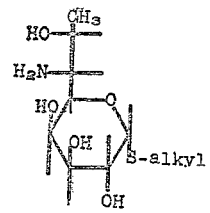

XLVI

Following the procedure of Example 8 substituting the ethylene iodohydrin by ethyl iodide, ethyl α-thiolincosaminide identical with that obtained from lincomycin C in Example 2 is obtained. By substituting propyl, butyl, pentyl, hexyl, heptyl, octyl, nonyl, undecyl, and dodecyl iodides and the isomeric forms thereof, there are obtained the corresponding alkyl α-thiolincosaminides.

Following the procedure of Example 1, compounds of the formula:

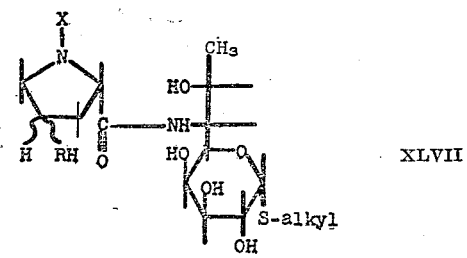

wherein X=R₁ or Z as given above and R is as given above, are obtained.

EXAMPLE 10.—2-O AND 7-O ALKYLATION OF ALKYL α- AND β-THIOLINCOSAMINIDES

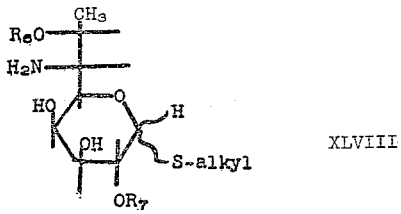

(A) *Methyl N-acetyl-3,4-O-isopropylidene-α-thiolincosaminide and the oxazoline derived therefrom*

Sixteen grams of methyl N-acetyl-α-thiolincosaminide was finely powdered and suspended in 1600 ml. of dry acetone with rapid magnetic stirring. To this suspension was added 16 ml. of concentrated sulfuric acid. The suspended solid began to dissolve and solution was complete within 30 to 60 minutes. After standing for 3 hours at room temperature (24–26° C.), the solution was cooled overnight in a refrigerator at about 5 to 10° C.

The pale yellow solution was neutralized by introducing, with stirring, a stream of dry ammonia gas. Ammonium sulfate precipitated and was removed by filtration and washed with acetone. The acetone washing was added to the colorless filtrate which was evaporated on a rotating evaporator at 30° C. and 15 mm. Hg pressure to yield a mixture of syrup and crystalline solids. The syrup was dissolved by swirling the mixture with 50 ml. of water, and the crystalline solid was collected on a filter and washed with ice-cold water. Upon drying at 60° C. and 15 mm. Hg pressure, 7.12 g. of solids were obtained of melting point 189–192° C. Recrystallization from acetone-Skellysolve B hexanes gave colorless needles of the oxazoline derived from methyl N-acetyl-3,4-O-isopropylidene-α-thiolincosaminide; melting point, 191–192.5° C.; rotation $[\alpha]_D^{25}$ +126° (c. 0.8508, ethanol).

*Analysis.*—Calcd. for $C_{14}H_{23}NO_5S$: C, 52.95; H, 7.30; N, 4.41; S, 10.10; O, 25.20. Found: C, 52.77; H, 7.34; N, 4.40; S, 10.12; O, 25.11.

The aqueous mother liquors were concentrated in vacuo to give a solid which was recrystallized from acetone; it consisted of methyl N-acetyl-3,4-O-isopropylidene-α-thiolincosaminide of melting point 178–180° C. and rotation $[\alpha]_D^{25}$ +189° (c. 0.5137, water).

(B) *Conversion of the oxazoline derived from methyl N-acetyl-3,4-O-isopropylidene α-thiolincosaminide to methyl N-acetyl-3,4-O-isopropylidene - α - thiolincosaminide*

A solution was prepared of the oxazoline derived from methyl N-acetyl-3,4-O-isopropylidene-α-thiolincosaminide in 20 ml. of hot water and heated under reflux for 2 hours at which time thin-layer chromatography on silica gel revealed the conversion of the starting material to methyl N-acetyl-3,4-O-isopropylidene - α - thiolincosaminide. The water was then removed in vacuo at 40° C., leaving a colorless crystalline solid which was recrystallized from a small volume of hot water to give colorless needles of methyl N-acetyl-3,4-O-isopropylidene-α-thiolincosaminide of melting point 178–180° C. and rotation $[\alpha]_D^{25}$ +190° (c. 1.223, water).

(C) *Methylation of methyl N-acetyl-3,4-O-isopropylidene-α-thiolincosaminide*

Potassium metal (1.16 g.) was dissolved in 100 ml. of t-butyl alcohol (previously dried over sodium metal) under stirring and reflux. The solvent was removed as completely as possible by distillation and finally by distillation in a vacuum of 15 mm. Hg. To the dry, solid residue was added 100 ml. of dry benzene, which was removed by distillation to leave a fine powder. This was treated again with benzene which was distilled off to insure complete removal of tert-butyl alcohol.

To the thus-obtained, powdery potassium tert-butoxide was added 200 ml. of dry benzene and the mixture was stirred magnetically at room temperature until an opalescent suspension resulted. To this was added 5 g. of methyl N-acetyl-3,4-O-isopropylidene-α-thiolincosaminide and the mixture was then stirred overnight at room temperature at the end of which time all of the solid had dissolved.

To this mixture was added 42.4 g. (18.6 ml.) of methyl iodide and the mixture was stirred at room temperature for 1½ hours; after 1 hour, the mixture gave a neutral reaction with moist pH paper. The reaction mixture was filtered to remove potassium iodide and the potassium iodide was washed with benzene; the benzene was added to the filtrate. The filtrate and washings were distilled in vacuo at 35° C. to give a colorless syrup which was subjected to countercurrent distribution in the system ethyl acetate:ethanol:water in the ratio 4:1:2. After 500 transfers the three components, as indicated by thin-layer chromatography, had been completely resolved. The major components were methyl N-acetyl-3,4-O-isopropylidene-7-O-methyl-α-thiolincosaminide and methyl N-acetyl - 3,4 - O - isopropylidene - 2 - O - methyl-α-thiolincosaminide. A minor component was methyl N-acetyl-3,4-O-isopropylidene-2,7-di-O-methyl-α-thiolincosaminide.

Removal of solvents from combined tubes No. 250–310 (K=1.30) inclusive gave a glassy material which crystallized from ethyl acetate:Skellysolve B hexanes to yield methyl N-acetyl-3,4-O-isopropylidene-2-O-methyl-α-thiolincosaminide as short, colorless prisms of melting point 176–177° C. and rotation $[\alpha]_D^{25}$ +176° (c. 0.6220, chloroform).

*Analysis.*—Calcd. for $C_{15}H_{27}NO_6S$: C, 51.57; H, 7.79; N, 4.01; S, 9.17; OMe, 8.88. Found: C, 51.82; H, 8.10; N, 4.08; S, 8.94; OMe, 8.49.

Removal of solvents from combined tubes No. 330–384 (K=2.52) inclusive by distillation gave a glassy product which crystallized slowly on standing. Recrystallization from ether gave clusters of minute, colorless needles of methyl N-acetyl-7-O-methyl-3,4-O-isopropylidene-α-thiolincosaminide.

Similarly, evaporation of the solvents from combined tubes No. 410–450 (K=5.67) gave a colorless glassy product. Recrystallization from ether gave colorless, chunky needles of methyl N-acetyl-2,7-di-O-methyl-3,4-O-isopropylidene-α-thiolincosaminide of melting point 124.5–126° C. and rotation $[\alpha]_D^{25}$ +184° (c. 0.8390, chloroform).

*Analysis.*—Calcd. for $C_{16}H_{29}NO_6S$: C, 52.88; H, 8.04; N, 3.85; S, 8.82; $OCH_3$, 17.08. Found: C, 53.02; H, 7.95; N, 4.05; S, 8.73; $OCH_3$, 15.92.

(C) *Methyl N-acetyl-2-O-methyl-α-thiolincosaminide*

A mixture of 2 g. of methyl N-acetyl-2-O-methyl-3,4-O-isopropylidene-α-thiolincosaminide in 50 ml. of 0.25 N hydrochloric acid was magnetically stirred at room temperature (about 25° C.). The solid starting material dissolved within minutes. After 1¾ hours, thin-layer chromatography showed the complete absence of starting material.

The strongly acidic solution was stirred with a polystyrene quaternary ammonium anion exchange resin until the colorless supernatant solution gave a neutral reaction with pH paper. Filtration, washing of the resin with water, and removal of the water from the combined filtrate and washes in vacuo gave 1.68 g. (95%) of a colorless crystalline residue which was crystallized from methanol-ether to give long, colorless, felted needles of methyl N-acetyl-2-O-methyl-α-thiolincosaminide of melting point 237–238° C.

*Analysis.*—Calcd. for $C_{12}H_{23}NO_6S$: C, 46.56; H, 7.49; N, 4.53; S, 10.36. Found: C, 46.72; H, 7.44; N, 4.37; S, 10.34.

(D) *Methyl 2-O-methyl-α-thiolincosaminide*

The thus-obtained methyl N-acetyl-2-O-methyl-α-thiolincosaminide was heated with 6 ml. of hydrazine hydrate under reflux for a period of 22 hours. The excess hydrazine hydrate was removed by distillation in vacuo and the residue was three times recrystallized from ethanol-water to give methyl 2-O-methyl-α-thiolincosaminide.

(E) *Methyl 7-O-methyl-α-thiolincosaminide*

In the manner given in parts C and D, methyl N-acetyl - 7 - O-methyl-3,4-O-isopropylidene-α-thiolincosaminide was hydrolyzed and then hydrazinolyzed to give methyl 7-O-methyl-α-thiolincosaminide.

(F) *Methyl 2,7-di-O-methyl-α-thiolincosaminide*

In the manner given in parts C and D, methyl N-acetyl-2,7 - di - O - methyl - 3,4 - O - isopropylidene-α-thiolincosaminide was hydrolyzed and then hydrazinolyzed to give methyl 2,7-di-O-methyl-α-thiolincosaminide.

By substituting the methyl α-thiolincosaminide by methyl β-thiolincosaminide or by the other alkyl α- or β-thiolincosaminides gives above, the corresponding alkyl 2-O-, 7-O-, and 2,7-di-O-alkyl-α- and β-thiolincosaminides are obtained.

Following the procedure of Example 1, compounds of the formula:

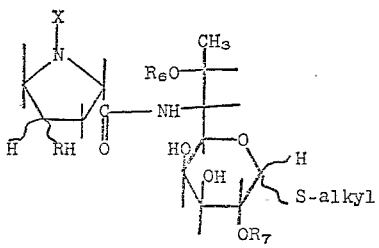

XLIX wherein $X=R_1$ or Z as given above, R is as given above, and one of $R_6$ and $R_7$ is alkyl of not more than 12 carbon atoms and the other is hydrogen or alkyl of not more than 12 carbon atoms, are obtained.

By substituting the methyl N-acetyl-α-thiolincosaminide by 2-hydroxyethyl α- and β-thiolincosaminides, the corresponding alkoxyethyl N-acetyl-2-O-, 7-O-, and 2,7-di-O-alkyl-α- and β-thiolincosaminides are obtained. By substituting the methyl N-acetyl-α-thiolincosaminide by 2-trityloxyethyl N-acetyl-α- and β-thiolincosaminides, the corresponding 2-trityloxyethyl N-acetyl-2-O-, 7-O-, and 2,7-di-O-alkyl-α- and β-thiolincosaminides are obtained. By removing the trityl group by hydrolyzing with 80% aqueous acetic acid and the N-acetyl by hydrazinolysis, the corresponding 2-hydroxyethyl 2-O-, 7-O-, and 2,7-di-O-alkyl-α- and β-thiolincosaminides are obtained.

Following the procedures of Example 1, compounds of the formula:

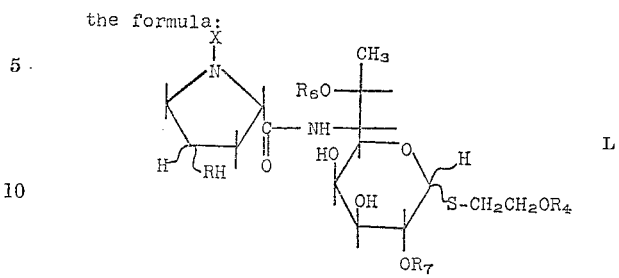

L wherein $X=R_1$ or Z as given above, R and $R_4$ are as given above, and at least one of $R_6$ and $R_7$ is alkyl of not more than 12 carbon atoms and the other is hydrogen or alkyl of not more than 12 carbon atoms, are obtained.

EXAMPLE 11.—METHYL 6-AMINO-6,8-DIDEOXY- 1 - THIO - L - THREO - α - D - GALACTO-OCTOPYRANOSIDE

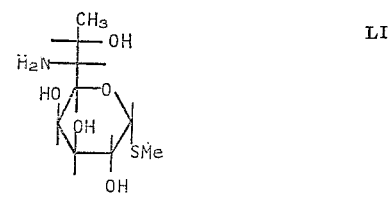

LI (A) *3,4-O-isopropylidenelincomycin*

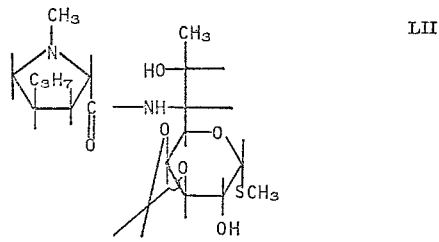

LII

A solution of 9.8 g. of lincomycin in 150 ml. of acetone is added to a solution of 9.8 g. of p-toluenesulfonic acid monohydrate in 100 ml. of acetone with good stirring and avoidance of exposure to moisture. The mixture is stirred at ambient temperature for 1 hour, after which 100 ml. of anhydrous ether is added and stirring is continued in an ice-bath for 0.5 hour. The mixture is filtered and the solid is dried in vacuo at 50° C.; yield 13.35 g. (85.5%) of 3,4-O-isopropylidenelincomycin p-toluenesulfonate. An additional 1.15 g. (7.4%) can be recovered from the mother liquors by adding 350 ml. of anhydrous ether to the mother liquor from the previous filtering operation and chilling the solution for 1 hour. The 14.5 g. so obtained are suspended in 200 ml. of ether and shaken vigorously with 125 ml. of 5% potassium bicarbonate solution. The aqueous layer is back-extracted with two 100-ml. portions of ether. The ether extracts are washed with 50 ml. of saturated sodium chloride solution and then filtered through anhydrous sodium sulfate. The ether is evaporated under vacuum, leaving 7.9 g. (73.1%) of 3,4-O-isopropylidenelincomycin which is dissolved in 25 ml. of ethyl acetate and concentrated to about 10 to 15 ml. The concentrate is allowed to stand at room temperature for several hours and then refrigerated overnight. The crystals thus obtained are filtered from the solution and washed sparingly with cold ethyl acetate; yield 4.55 g. (42.2%) of 3,4-O-isopropylidenelincomycin having a melting point of 126–128° C., and an optical rotation of $[\alpha]_D^{25}$ +101–102° (c. 1, methylene chloride).

(B) *7-dehydro-3-4-O-isopropylidenelincomycin*

To a solution of 6 g. (0.0135 moles) of 3,4-O-isopropylidenelincomycin in 75 ml. of pyridine was added 12 g. (excess) of chromium trioxide (chromic acid). The temperature of solution rose about 20° C. After one hour the mixture was added to a solution containing 250 ml. each of ethyl ether and ethyl acetate, filtered, and evaporated to 8.4 g. of syrup. This syrup was distributed in a 500-transfer counter current distribution using the system, water:ethyl acetate:ethanol:cyclohexane (1:1:1:1). 7-dehydro - 3,4 - O - isopropylidenelincomycin was isolated from tubes 330–380, K=2.45.

*Analysis.*—Calcd. for $C_{31}H_{56}N_2O_6S$: C, 56.72; H, 8.16; N, 6.30; S, 7.21. Found: C, 56.37; H, 7.62; N, 6.51; S, 6.84.

(C) *3,4-O-isopropylideneepilincomycin*

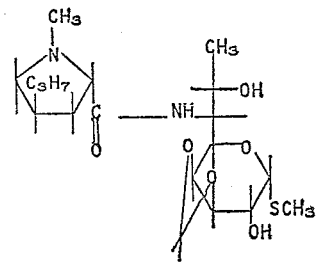

LII

To 1.6 g. of Craig pure 7-dehydro-3,4-O-isopropylidenelincomycin in 75 ml. of methanol was added 400 mg. of sodium borohydride. After 1.5 hr. this solution was evaporated to dryness on a rotary evaporator. The residue was added to 25 ml. of water which was extracted three times with 25 ml. portions of methylene chloride. The extract was back-washed with 15 ml. of water, dried over magnesium chloride, and evaporated to dryness. The residue, 1.4 g., was distributed in a 500-transfer counter current distribution using the solvent system, water:ethyl acetate:ethanol:cyclohexane (1:1:1:1) and a single peak which fit the theoretical was observed at K=1.05. The material is pooled tubes 240–280 was isolated as a syrup.

*Analysis.*—Calcd. for $C_{21}H_{38}N_2O_6S$: C, 56.47; H, 8.58; N, 6.27; S, 7.18. Found: C, 56.24; H, 8.54; N, 6.13; S, 7.01.

Thin layer chromatography (TLC) showed that this material consisted of two substances, one of which was 3,4-O-isopropylidenelincomycin. The other, 3,4-O-isopropylideneepilincomycin moved slightly slower.

(D) *Epilincomycin*

The syrup from part C was dissolved in a mixture of 60 ml. of 0.25 N hydrochloric acid and 40 ml. of ethanol and allowed to stand at room temperature for 5 hours. The solution was then kept at 0° C. for 4 days, neutralized with sodium bicarbonate, concentrated to 25 ml., and extracted with chloroform. The extract was washed with a little water and dried over magnesium sulfate, then evaporated to a residue. Thin layer chromatography of the residue showed two substances, both of which were active against *S. lutea*. The residue was chromatographed on a 14" x ¾" Florisil (a synthetic silicate of the type described in U.S. Patent 2,393,625) column which was eluted gradiently with a total volume of 5,000 ml. of solvent which varied continuously from 100% Skellysolve B (technical hexane) to 100% acetone, 40 ml. fractions being collected. Fractions 53–65 yielded epilincomycin, assaying 450 mcg./mg.

*Analysis.*—Calcd. for $C_{18}H_{34}N_2O_6S$: C, 50.92; H, 8.55; N, 6.60; S, 7.56. Found: C, 50.19; H, 7.91; N, 6.05; S, 6.42.

Fractions 73–104 yielded lincomycin, assaying 950 mcg./mg.

(E) *Methyl epi-α-thiolincosaminide*

Following the hydrazinolysis procedure of Example 1, part B, epilincomycin is convetred to methyl epi-α-thiolincosaminide.

Lincomycin can be substituted by methyl N-acetyl-α-thiolincosaminide. The process can also be applied to other 6-acylamino-6,8-dideoxy-D-erythro-D-galacto-octopyranose compounds of the formula:

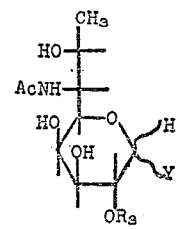

LIV where Ac, Y and $R_3$ are as given above to form the corresponding epimers:

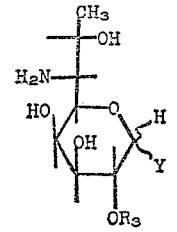

LV which can be alkylated by the procedure given above to provide compounds of the formula:

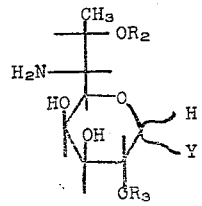

LVI

There can thus be obtained 6-amino-6,8-dideoxy-L-threo-D-galacto-; 6-amino-2-O-alkyl-6,8-dideoxy-L-threo-D-galacto-; 6-amino-7-O-alkyl-6,8-dideoxy-L-threo-D-galacto-; and 6-amino-2,7-di-O-alkyl-6,8-dideoxy-L-threo-D-galacto-octopyranose compounds which in turn can be treated by the procedure of Example 1, part C et seq., to give compounds of the formula:

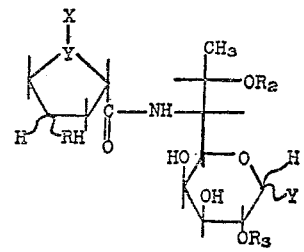

LVII wherein X=Z or $R_1$ as given above and Y, R, $R_2$, and $R_3$ are as given above.

The intermediates of Formula III can be used as a buffer or as an antacid. They react with isocyanates to form urethanes and can be used to modify polyurethane resins. The thiocyanic acid addition salt when condensed with formaldehyde forms resinous materials useful as pickling inhibitors according to U.S. Patents 2,425,320 and 2,606,155. The free bases also make good vehicles for toxic acids. For example, the fluosilicic acid addition salts are useful as mothproofing agents according to U.S. Patents 1,915,334 and 2,075,359 and the hexafluoroarsenic acid and hexafluorophosphoric acid addition salts are useful as parasiticides according to U.S. Patents 3,122,536 and 3,122,552.

Various acid-addition salts of the free base form of the intermediates of Formula III can be made by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenyl-salicylic, 5-phenylsalicylic, 3-methylglutaric, orthosulfo-benzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, dimethyldithiocarbamic, cyclohexyl-sulfamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis.

Typical compounds prepared according to Examples 4, 8, and 9 include both the cis and trans forms of the following compounds according to each of Formulas XXXVII, XXXVIII, XLV and XLVII.

TABLE I

|     | RH | $R_1$ | $R_4$ | Alkyl |
| --- | --- | --- | --- | --- |
| (a) | $CH_3$ | H |  | $CH_3$ |
| (b) | $CH_3$ | $CH_3$ |  | $CH_3$ |
| (c) | $CH_3$ | $C_2H_5$ |  | $CH_3$ |
| (d) | $C_2H_5$ | H |  | $C_2H_5$ |
| (e) | $C_2H_5$ | $C_2H_5$ |  | $C_2H_5$ |
| (f) | n-$C_3H_7$ | H |  | $C_2H_5$ |
| (g) | n-$C_3H_7$ | $CH_3$ |  | $C_2H_5$ |
| (h) | n-$C_4H_9$ | H |  | $CH_3$ |
| (i) | n-$C_4H_9$ | $CH_3$ |  | $CH_3$ |
| (j) | n-$C_4H_9$ | $C_2H_5$ |  | $C_2H_5$ |
| (k) | n-$C_4H_9$ | H |  | $C_2H_5$ |
| (l) | n-$C_4H_9$ | $CH_3$ |  | $C_2H_5$ |
| (m) | $CH_3$ | H | H |  |
| (n) | $CH_3$ | $CH_3$ | H |  |
| (o) | $CH_3$ | $CH_3$ | $CH_3$ |  |
| (p) | $C_2H_5$ | H | H |  |
| (q) | $C_2H_5$ | $C_2H_5$ | $C_2H_5$ |  |
| (r) | n-$C_3H_7$ | H | H |  |
| (s) | n-$C_3H_7$ | $CH_3$ | H |  |
| (t) | n-$C_3H_7$ | $CH_3$ | $CH_3$ |  |
| (u) | n-$C_4H_9$ | H | H |  |
| (v) | n-$C_4H_9$ | $CH_3$ | H |  |
| (y) | n-$C_4H_9$ | $CH_3$ | $CH_3$ |  |

Typical compounds prepared according to Examples 5, 6, and 7 include both the cis and trans forms of the following compounds according to formulas XL, XLII, and XLIV.

TABLE II

|     | RH | $R_1$ |
| --- | --- | --- |
| (a) | $CH_3$ | H |
| (b) | $CH_3$ | $CH_3$ |
| (c) | $CH_3$ | $C_2H_5$ |
| (d) | $C_2H_5$ | H |
| (e) | $C_2H_5$ | $CH_3$ |
| (f) | $C_2H_5$ | $C_2H_5$ |
| (g) | n-$C_3H_7$ | H |
| (h) | n-$C_3H_7$ | $CH_3$ |
| (i) | n-$C_3H_7$ | $C_2H_5$ |
| (j) | n-$C_4H_9$ | H |
| (k) | n-$C_4H_9$ | $CH_3$ |
| (l) | n-$C_4H_9$ | $C_2H_5$ |

Typial compounds according to Formulas XLIX and L prepared according to Example 10 include each of the compounds listed above in which the 2-O-hydrogen ($R_7$), and the 7-O-hydrogen ($R_6$), and the 2-O-and 7-O-hydrogens ($R_7$ and $R_6$) are replaced by alkyl, for example, methyl, ethyl, propyl, butyl, pentyl, hexyl, heptyl, octyl, nonyl, decyl, undecyl, and dodecyl and the isomeric forms thereof.

Typical compounds according to Formula LVII include each of the above compounds in the L-threo configuration.

EXAMPLE 12.— CONVERSION OF LINCOMYCIN HYDROCHLORIDE TO THE S-ETHYL ANALOG OF LINCOMYCIN HYDROCHLORIDE

Lincomycin hydrochloride (8.85 g., 0.02 mole) was dissolved in 20 ml. of water, cooled to 0° and stirred while adding bromine (3.52 g., 0.022 mole) dropwise over a one minute period. Ethanethiol (25 ml.) was added and the mixture stirred at 25° for 2 hours. The clear, colorless, 2-phase system (ethanethiol is relatively insoluble in water) was cooled in an ice-bath and hydrogen chloride gas bubbled in for about 5 minutes. The lower aqueous phase turned red. The reaction mixture was then extracted 3 times with 100 ml. portions of Skellysolve B (technical hexane) and aqueous sodium hydroxide solution added to bring the aqueous phase to pH 11. The basic phase was extracted well with chloroform. The chloroform extracts were washed with saturated sodium chloride solution, dried, and evaporated under vacuum to yield 6.2 g. of a white solid. Of this solid, 4.8 g. was adsorbed on 15 g. of silica gel in methylene chloride, dried and sifted onto a 2½ inch diameter column of 800 g. of silica gel. The column was then eluted with a mixture of methanol and chloroform in the proportions of 1 to 7. After 800 ml. of forerun, eighty 25-ml. fractions were collected. Fractions 40 through 58 were combined, evaporated to dryness, and the residue recrystallized from acetone. About 0.5 g. of 6,8 - dideoxy-6-trans-1-methyl-4-propyl - L-2-pyrrolidinecarboxamido-D-erythro - D - galacto-aldehydo-octose diethyl dithioacetal of the following formula:

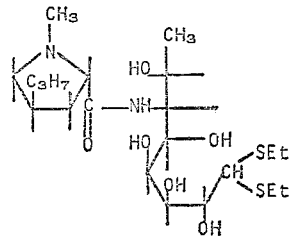

was obtained.

*Analysis.*—Calcd. for $C_{21}H_{42}N_2O_6S_2$: C, 52.25; H, 8.77; N, 5.80; S, 13.29. Found: C, 52.16; H, 8.77; N, 5.84; S, 13.30.

Fractions 65 through 75 were combined, evaporated to dryness, and the residue converted to the hydrochloride salt and recrystallized from aqueous acetone to yield about 0.5 g. of the S-ethyl analog of lincomycin hydrochloride, ethyl 6,8-dideoxy-6-(trans-1-methyl-4-propyl-L-2-pyrrolidinecarboxamido) - 1 - thio - D - erythro - α - D-galacto - octopyranoside hydrochloride; $[\alpha]_D^{25}+147°$ (c.=1.1206 in $H_2O$).

*Analysis.*—Calcd. for $C_{19}H_{35}N_2O_6S \cdot HCl$: C, 49.93; H, 8.16; Cl, 7.76; N, 6.13; S, 7.01. Found: C, 49.53; H, 8.23; Cl, 7.39; N, 6.04; S, 6.88.

This product had an antibacterial activity about 2 times lincomycin and was identical with the S-ethyl analog of lincomycin (lincomycin C) prepared by carrying out the fermentation according to U.S. Patent 3,086,912 in the presence of added ethionine.

EXAMPLE 13.—CONVERSION OF LINCOMYCIN HYDROCHLORIDE TO THE S-ISOPROPYL ANALOG OF LINCOMYCIN HYDROCHLORIDE

Lincomycin hydrochloride (35.4 g., 0.08 mole) was dissolved in 80 ml. of water, cooled to 0° C. and stirred while adding bromine (14.08 g., 0.088 mole) dropwise over a 5 minute period. 2-propanethiol (80 ml.) and 1400 ml. of tetrahydrofuran were added and hydrogen chloride gas bubbled in vigorously until the temperature of the reaction rose to 43° C. At this temperature the two phase system became homogeneous. Hydrogen chloride gas addition was stopped and the reaction solution stirred without external heating or cooling for two hours. The tetrahydrofuran was distilled under vacuum and the aqueous residue was worked up as described in Example 12 to yield the S-isopropyl analog of lincomycin hydrochloride. This compound exhibited about the same antibacterial activity as lincomycin hydrochloride and had an optical rotation of $[\alpha]_D^{25} +137°$ (c.=0.6798, $H_2O$), and the following elemental analysis:

Calcd. for $C_{20}H_{38}N_2O_6S \cdot HCl$: C. 50.99; H, 8.35; N, 5.95; S, 6.81; Cl, 7.53. Found: C, 51.23; H, 8.39; N, 5.92; S, 7.02; Cl, 7.58.

EXAMPLE 14

Following the procedure of Example 13 substituting the ethanethiol by butanethiol, the S-butyl analog of lincomycin hydrochloride is obtained. This product had an antibacterial activity of about 2 times that of lincomycin, an optical rotation of $[\alpha]_D^{25} +130°$ (c.=0.4070, $H_2O$), and the following elemental analysis:

Calcd. for $C_{21}H_{40}N_2O_6S \cdot HCl$: C, 51.99; H, 8.52; N, 5.78; S, 6.61. Found: C, 50.64; H, 8.33; N, 5.68; S, 6.41.

EXAMPLE 15

Following the procedure of Example 13 substituting the ethanethiol by cyclohexanethiol, the S-cyclohexyl analog of lincomycin hydrochloride is obtained. This compound had an antibacterial activity about 2 times that of lincomycin, an optical rotation of $[\alpha]_D^{25} +123°$ (c.=0.9952, $H_2O$), and the following elemental analysis:

Calcd. for $C_{23}H_{42}N_2O_6S \cdot HCl$: C, 54.04; H, 8.48; N, 5.48; S, 6.27; Cl, 6.94. Found: C, 53.57; H, 8.74; N, 5.37; S, 6.25; Cl, 6.66.

By substituting the alkanethiols of Examples 12, 13, and 14 by other alkanethiols, for example, propane-, pentane-, hexane-, heptane-, octane-, nonane-, decane-, undecane-, and dodecanethiol and the isomeric forms thereof, the corresponding alkyl 6,8-dideoxy-6-(trans-1-methyl-4-propyl-L-2-pyrrolidinecarboxamido)-1-thio - D-erythro-α-D-galacto-octanopyranosides are obtained.

On hydrazinolysis, or on applying the above procedural steps to the free sugar hydrochloride which bears no acyl group on the amino group in the 6-position, the corresponding alkyl 6-amino-6,8-dideoxy-1-thio-D-erythro-α-D-galacto-octopyranosides are obtained.

Lincomycin C is also obtained by reacting lincomycin with ethanethiol (ethyl mercaptan) to form a diethyl dithioacetal and heating the latter in the presence of p-toluene-sulfonic acid or by heating to fusion. The following example is illustrative.

EXAMPLE 16

(A) *6,8dideoxy-6-(trans-1-Methyl-4-propyl-L-2-pyrrolidinecarboxamido)-D-erythro-D-galacto-aldehydo-octose diethyl dithioacetal*

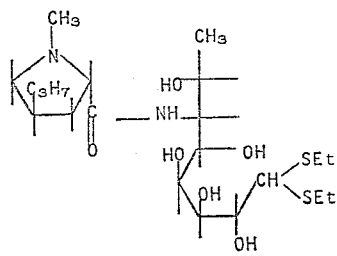

In a 1-liter, 3-necked flask were placed concentrated hydrochloric acid (150 cc.) and ethanethiol (50 cc., previously cooled to 0°), followed by lincomycin hydrochloride (15.0 gm.). After stirring magnetically at room temperature for 5 hours, the reaction mixture was diluted with an equal volume of ice-water, and the solution extracted thoroughly with Skellysolve B (technical hexane), these extracts being discarded.

The majority of the acid was neutralized by the careful addition of solid potassium hydroxide (100 gm.), keeping the temperature of the well-stirred reaction mixture between 20 and 30° C. by cooling in acetone-Dry Ice. Solid potassium chloride was removed by filtration, and the solid washed well with chloroform. Additional chloroform was added to the filtrate (ca. 150 cc.) and the mixture, stirred magnetically, was adjusted to pH 10 by the addition of aqueous sodium hydroxide (2 N). The chloroform layer was separated, the aqueous layer extracted thoroughly with chloroform, the combined extracts washed twice with water, and dried over anhydrous sodium sulfate. Removal of the solvent at 30° C. in vacuo gave a semi-solid residue which on being crystallized from acetone, gave 5.41 gm. of 6,8-dideoxy-6-(trans-1-methyl-4-propyl - L - 2 - pyrrolidinecarboxamido) - D - erythro-D-galacto-aldehydo-octose diethyl dithioacetal as colorless flattened needles, M.P. 130–132°. Concentration of the mother-liquors gave additional material (1.50 gm.), M.P. 129–131°. (Total yield, 6.91 gm., 42.4%.)

*Analysis.*—Calcd. for $C_{21}H_{42}N_2O_6S_2$: C, 52.25; H, 8.77; N, 5.80; S, 13.29%. Found: C, 52.38; H, 8.71; N, 5.93; S, 13.46%.

(B) *Cyclization to Lincomycin C*

(a) One part each of the diethyl dithioacetal of Part A and p-toluenesulfonic acid monohydrate were refluxed in 25 parts of acetonitrile until substantial antibacterial activity was obtained. The reaction mixture was cooled and evaporated to dryness and chromatographed on silica gel using a solvent mixture of ethyl acetate, acetone and water in the ratio of 8:5:1, respectively. Fractions 102 through 131 showed antibacterial activity. Of these, fractions 105 through 125 were pooled, evaporated to dryness, crystallized from acetone acidified with hydrochloric acid, and recrystallized by dissolving in water and adding acetone to give crystals of lincomycin C hydrochloride, M.P. 149–153°.

(b) The diethyl dithioacetal of Part A was heated to 260° for about 3 minutes and the odor of ethyl mercaptan was noted. The product on being chromatographed as in Part B(a) yielded lincomycin C.

We claim:

1. A process which comprises N-acylating with a compound of the formula

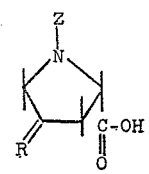

(C)

or the formula

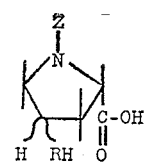

(D)

wherein Z is a protective group removable by hydrogenolysis; R is alkylidene of not more than 20 carbon atoms, cycloalkylidene of 3 to not more than 8 carbon atoms, or aralkylidene of not more than 12 carbon atoms, a compound of the formula

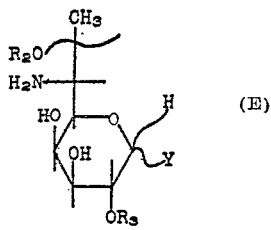

wherein $R_2$ and $R_3$ are hydrogen or alkyl of not more than 12 carbon atoms. Y is hydrogen, -S-alkyl of not more than 12 carbon atoms, $-SCH_2CH_2OH$, or $-SCH_2CH_2OR_4$ wherein $R_4$ is alkyl of not more than 12 carbon atoms, and hydrogenating the compound thus formed over a palladium catalyst to remove the Z group and to form a compound of the formula

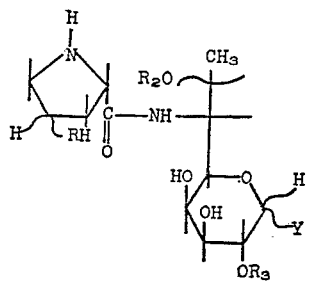

wherein R, $R_2$, $R_3$ and Y are as given above.

2. The process of claim 1 in which alkylation is effected by reacting the compound of the formula

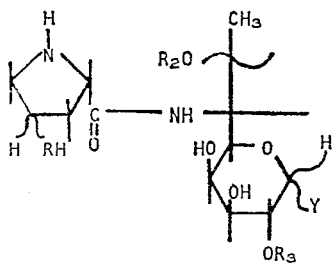

with an oxo compound of the formula $R_8R_9CO$ wherein $R_8R_9C=$ is a member of the group consisting of alkylidene of not more than 20 carbon atoms, cycloalkylidene of from 3 to not more than 8 carbon atoms, and aralkylidene of not more than 12 carbon atoms, and then hydrogenating in the presence of a catalyst effective to saturate an olefinic double bond.

3. A process which comprises reacting a compound of the formula

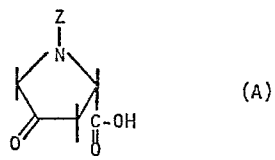

with a Wittig reagent of the formula $R=P(C_6H_5)_3$     (B)

to form a compound of the formula

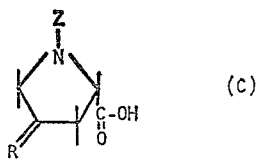

hydrogenating the compound of Formula C over a platinum catalyst to saturate the alkylidene group to form a compound of the formula

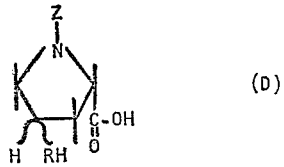

N-acylating a compound of the formula

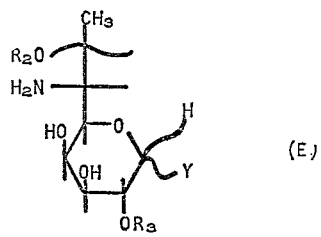

with a compound of Formula D to form a compound of the formula

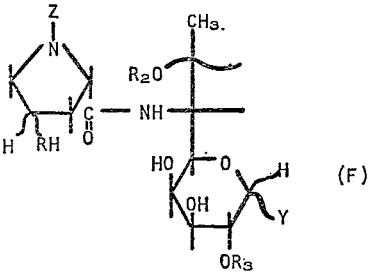

and hydrogenating the compound of Formula F over a palladium catalyst to remove the Z group and to form a compound of the formula

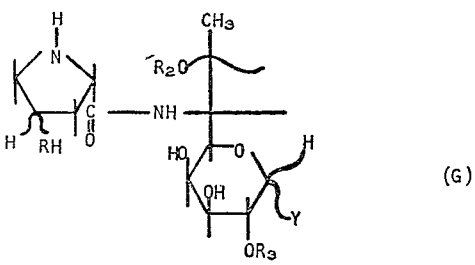

wherein R, $R_2$, $R_3$, Y, and Z are as given in claim 1.

4. A process which comprises reacting a compound of the formula

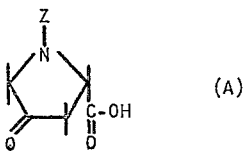

with a Wittig reagent of the formula $R=P(C_6H_5)_3$     (B)

to form a compound of the formula

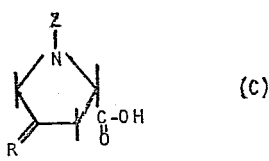

hydrogenating the compound of Formula C over a platinum catalyst to saturate the alkylidene group to form a compound of the formula

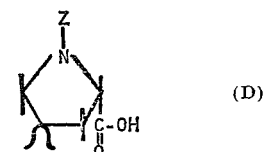

N-acylating a compound of the formula

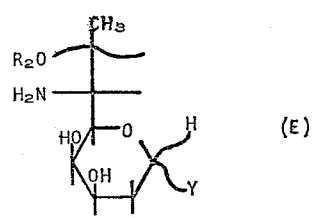

with a compound of Formula D to form a compound of the formula

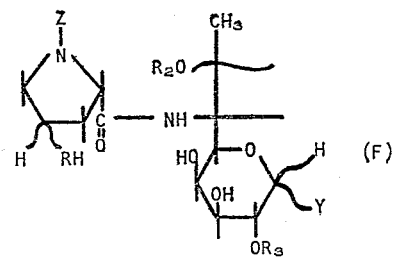

wherein R, $R_2$, $R_3$, Y, and Z are as given in claim 1.

5. A process which comprises hydrogenating with a platinum catalyst a compound of the formula

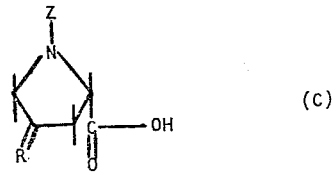

to form a compound of the formula

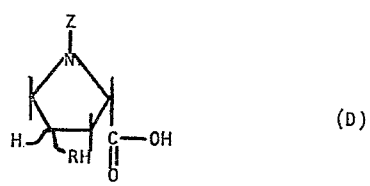

N-acylating a compound of the formula

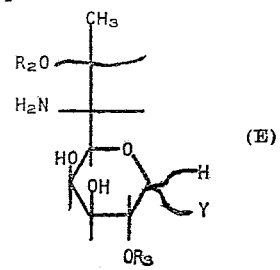

with a compound of Formula D to form a compound of the formula

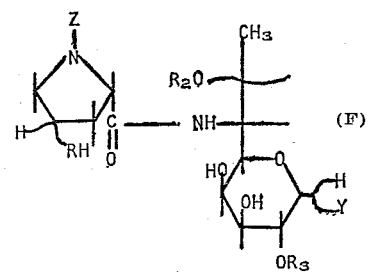

hydrogenating the compound of Formula F over a palladium catalyst to remove the Z group and to form a compound of the formula

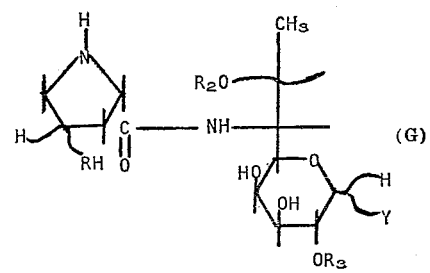

and alkylating the compound of Formula G to form a compound of the formula

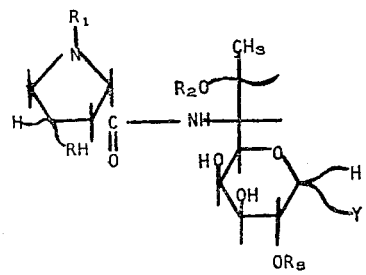

wherein R, $R_2$, $R_3$, Y, and Z are as given in claim 1, and $R_1$ is alkyl of not more than 20 carbon atoms, cycloalkyl of not more than 8 carbon atoms, and aralkyl of not more than 12 carbon atoms.

6. The process of claim 5 in which the alkylation is effected by reacting the compound of Formula G with an oxo compound of the formula $R_8R_9CO$ wherein $R_8R_9C=$ is a member of the group consisting of alkylidene of not more than 20 carbon atoms, cycloalkylidene of from 3 to not more than 8 carbon atoms, and aralkylidene of not more than 12 carbon atoms, and then hydrogenating in the presence of a catalyst effective to saturate an olefinic double bond.

7. A process which comprises hydrogenating over a platinum catalyst a compound of the formula

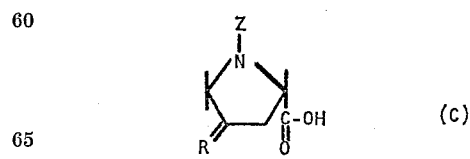

to form a compound of the formula

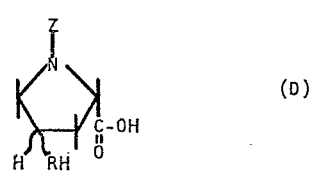

N-acylating a compound of the formula

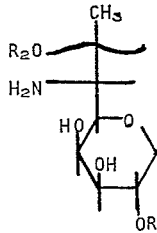 (E)

with the compound of Formula D to form a compound of the formula

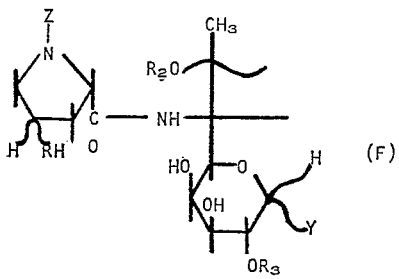 (F)

and hydrogenating the compound of Formula F over a palladium catalyst to remove the Z group and to form a compound of the formula

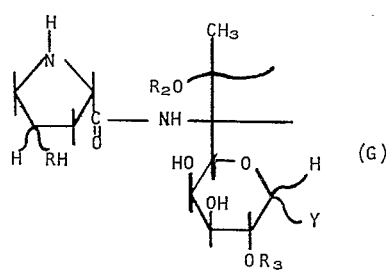 (G)

wherein R, $R_2$, $R_3$, Y, and Z are as given in claim 1.

8. A process which comprises hydrogenating over a platinum catalyst a compound of the formula

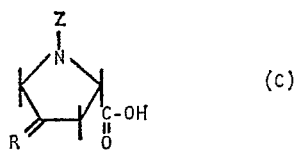 (C)

to form a compound of the formula

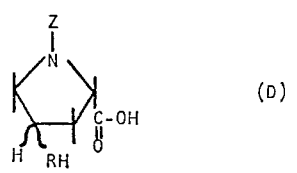 (D)

and N-acylating a compound of the formula

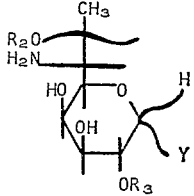 (E)

with a compound of Formula D to form a compound of the formula

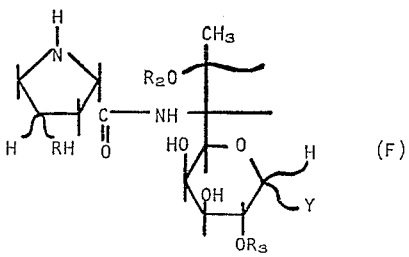 (F)

wherein R, $R_2$, $R_3$, Y, and Z are as given in claim 1.

9. A process which comprises reacting a compound of the formula

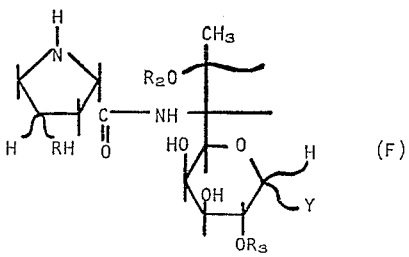 (A)

with a Wittig reagent of the formula $$R{=}P(C_6H_5)_3 \qquad (B)$$

to form a compound of the formula

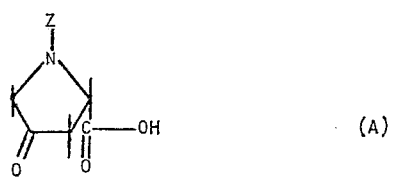 (C)

N-acylating a compound of the formula

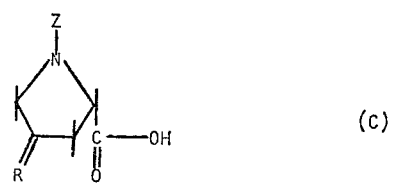 (E)

with a compound of Formula C to form a compound of the formula

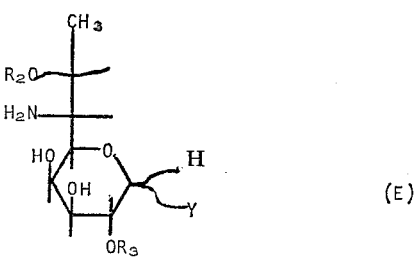 (I)

hydrogenating the compound of Formula I to saturate the olefinic double bond connecting the alkylidene group and to remove the Z group to form a compound of the formula

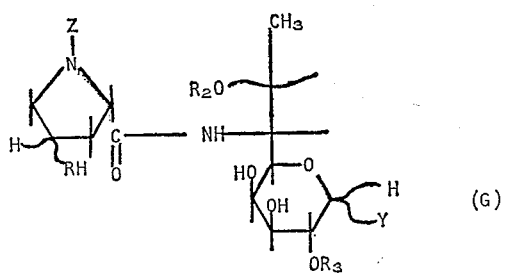

and alkylating the compound of Formula G to form a compound of the formula

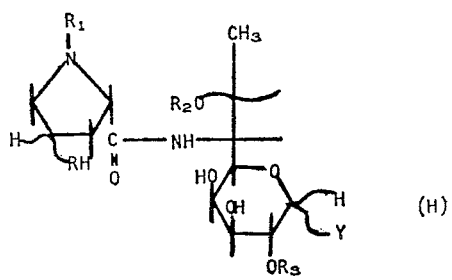

wherein R, $R_2$, $R_3$, Y, and Z are as given in claim 1, and $R_1$ is alkyl of not more than 20 carbon atoms, cycloalkyl of not more than 8 carbon atoms, and aralkyl of not more than 12 carbon atoms.

10. A process which comprises reacting a compound of the formula

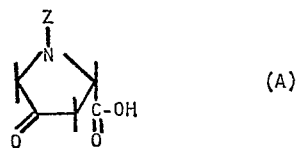

with a Wittig reagent of the formula $$R=P(C_6H_5)_3 \qquad (B)$$

to form a compound of the formula

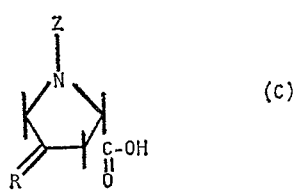

N-acylating a compound of the formula

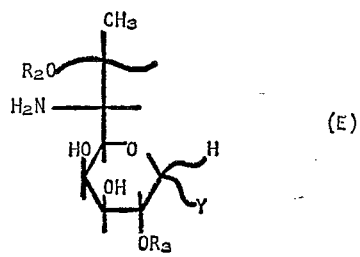

with a compound of Formula C to form a compound of the formula

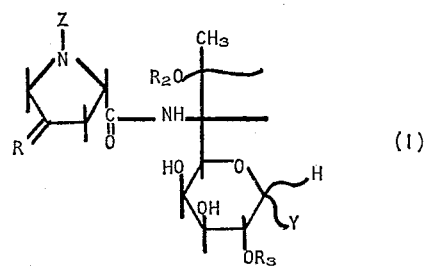

hydrogenating the compound of Formula I to saturate the olefinic double bond connecting the alkylidene group and to remove the Z group to form a compound of the formula

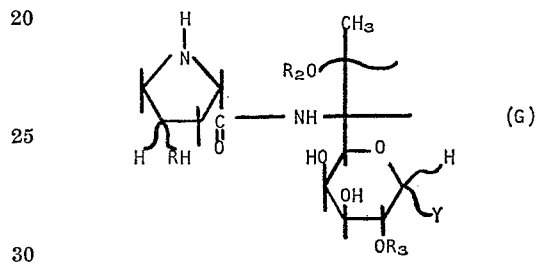

wherein R, $R_2$, $R_3$, Y, and Z are as given in claim 1.

11. A process which comprises N-acylating a compound of the formula

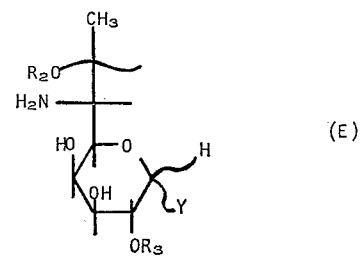

with a compound of the formula

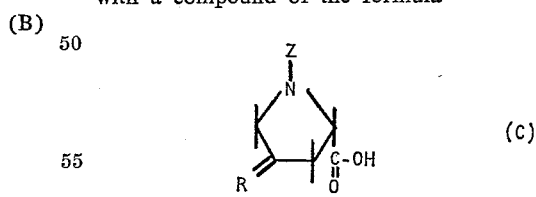

to form a compound of the formula

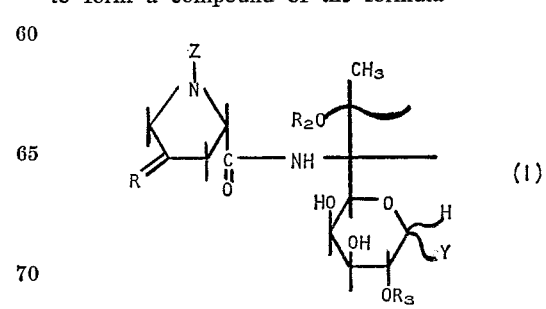

and hydrogenating the compound of Formula I to saturate the olefinic double bond connecting the alkylidene group and to remove the Z group to form a compound of the formula

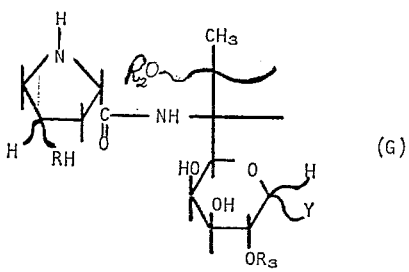
(G)

wherein R, R₂, R₃, Y, and Z are as given in claim 1.

12. A compound of the formula

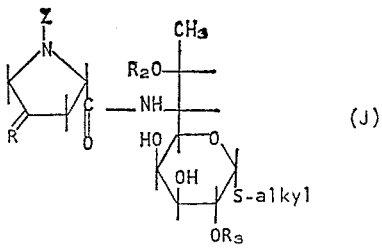
(J)

or the formula

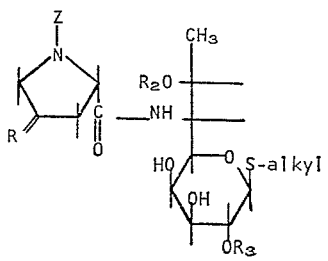

wherein R, R₂, R₃, and Z are as given in claim 1 and alkyl is of not more than 12 carbon atoms.

13. A compound of the formula:

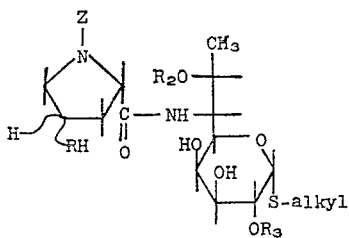
(O)

or the formula

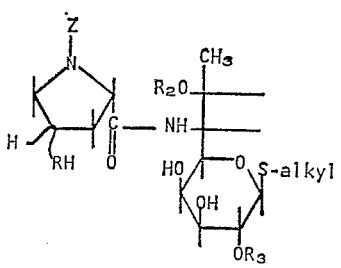

wherein R, R₂, R₃, and Z are as given in claim 1 and alkyl is of not more than 12 carbon atoms.

14. A member of the group consisting of the free base and acid addition salt forms of a compound of the formula:

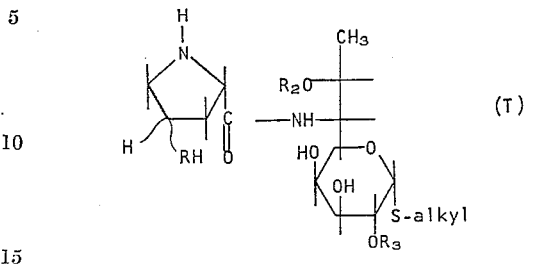
(T)

wherein R, R₂, and R₃ are as given in claim 1 and alkyl is of 3 and not more than 12 carbon atoms.

15. A member of the group consisting of the free base and acid addition salt forms of a compound of the formula:

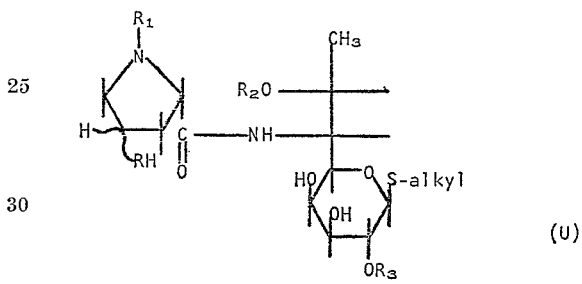
(U)

wherein $R_1$ is hydrogen, alkyl of not more than 20 carbon atoms, cycloalkyl of 3 to not more than 8 carbon atoms, and aralkyl of not more than 12 carbon atoms; $R_2$ and $R_3$ are hydrogen or alkyl of not more than 12 carbon atoms; R is alkylidene of not more than 20 carbon atoms, cycloalkylidene of 3 to not more than 8 carbon atoms, or aralkylidene of not more than 12 carbon atoms; and alkyl is of not more than 12 carbon atoms.

16. A member of the group consisting of the free base and acid addition salt forms of a compound of the formula:

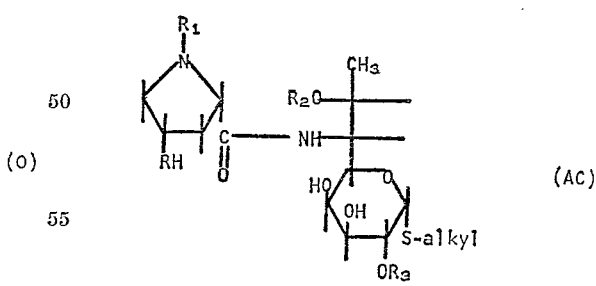
(AC)

or the formula

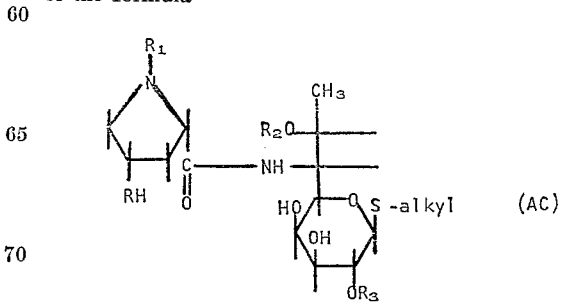
(AC)

wherein R, R₁, R₂, R₃, and alkyl are as given in claim 15.

17. A member of the group consisting of the free base and acid addition salt forms of a compound of the formula:

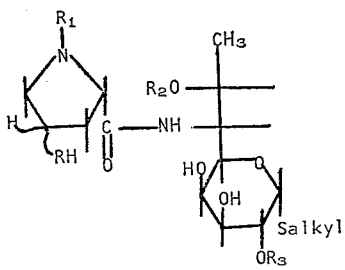

wherein alkyl is of not more than 12 carbon atoms, R is a member of the group consisting of alkylidene of not more than 20 carbon atoms, cycloalkylidene of 3 to not more than 8 carbon atoms, and aralkylidene of not more than 12 carbon atoms, $R_1$ is a member of the group consisting of hydrogen, alkyl of not more than 20 carbon atoms, cycloalkyl of 3 to not more than 8 carbon atoms, and aralkyl of not more than 12 carbon atoms, and one of $R_6$ and $R_7$ is an alkyl group of not more than 12 carbon atoms and the other is a member of the group consisting of hydrogen and an alkyl of not more than 12 carbon atoms.

18. A member of the group consisting of the free base and acid addition salt forms of a compound of the formula:

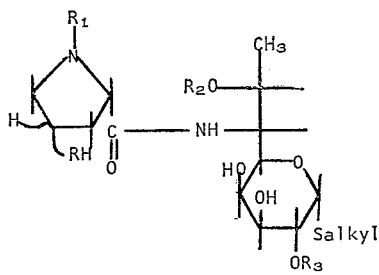

wherein R is alkylidene of 4 to not more than 12 carbon atoms, $R_1$, $R_2$, $R_3$, and alkyl are as given in claim 15.

19. A member of the group consisting of the free base and acid addition salt forms of a compound of the formula

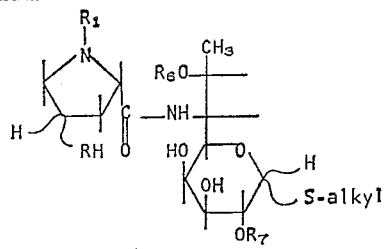

(AH)

wherein $R_1$ is alkyl of 3 to not more than 12 carbon atoms, R, $R_2$, $R_3$ and alkyl are as given in claim 15 or wherein R, $R_2$ and $R_3$ are as given in claim 15, $R_1$ is as given in claim 15, and alkyl is of 3 to not more than 12 carbon atoms.

20. A member of the group consisting of the free base and acid addition salt forms of a compound of the formula:

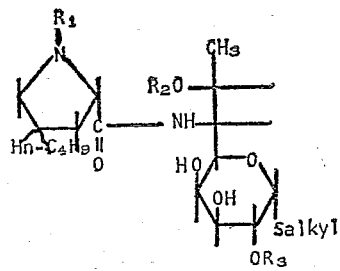

wherein $R_1$, $R_2$, $R_3$, and alkyl are as given in claim 15.

21. A member of the group consisting of the free base and acid addition salt forms of a compound of the formula:

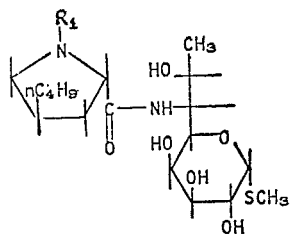

wherein $R_1$ is hydrogen, methyl, or ethyl.

22. A member of the group consisting of the free base and acid addition salt forms of a compound of the formula:

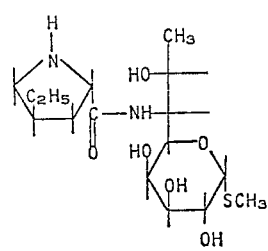

23. A member of the group consisting of the free base and acid addition salt forms of a compound of the formula:

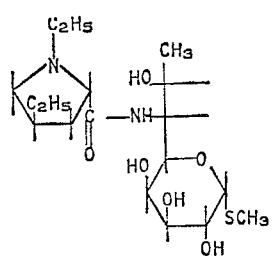

24. A member of the group consisting of the free base and acid addition salt forms of a compound of the formula:

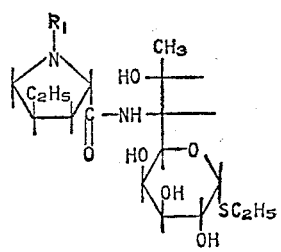

wherein $R_1$ is hydrogen, methyl, or ethyl.

25. A member of the group consisting of the free base and acid addition salt forms of a compound of the formula:

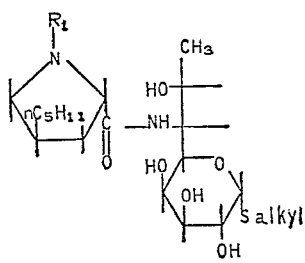

wherein $R_1$ is hydrogen, methyl, or ethyl and alkyl is methyl or ethyl.

26. A member of the group consisting of the free base and acid addition salt forms of a compound of the formula:

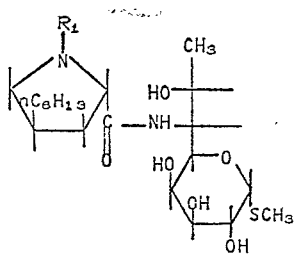

wherein $R_1$ is hydrogen, methyl, or ethyl.

27. A member of the group consisting of the free base and acid addition salt forms of a compound of the formula:

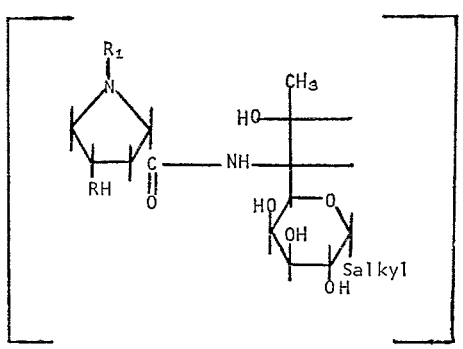

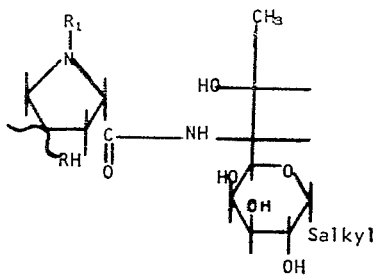

wherein RH is butyl, pentyl or hexyl, $R_1$ is hydrogen, methyl or ethyl, and alkyl is methyl or ethyl.

28. A process for preparing a compound of the formula

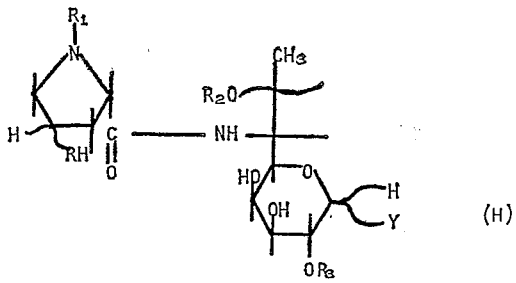 (H)

which comprises alkylating a compound of the formula

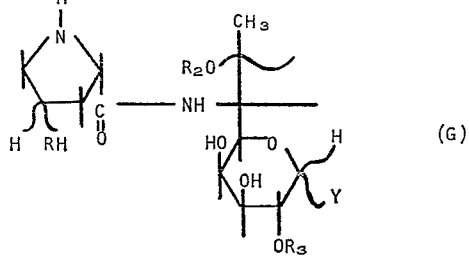 (G)

wherein R, $R_2$, $R_3$, and Y are as given in claim 1, and $R_1$ is alkyl of not more than 20 carbon atoms, cycloalkyl of not more than 8 carbon atoms, and aralkyl of not more than 12 carbon atoms.

29. The process of claim 28 in which the alkylation is effected by reacting the compound of the formula

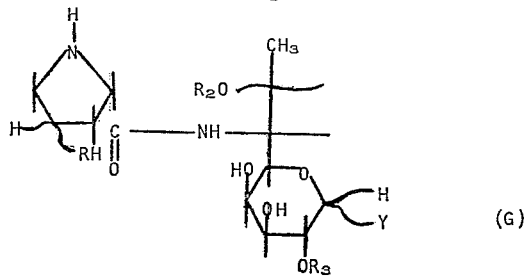 (G)

with an oxo compound of the formula $R_8R_9CO$ wherein $R_8R_9C=$ is a member of the group consisting of alkylidene of not more than 20 carbon atoms, cycloalkylidene of from 3 to not more than 8 carbon atoms, and aralkylidene of not more than 12 carbon atoms and then hydrogenating in the presence of a catalyst effective to saturate an olefinic double bond.

30. A process which comprises reacting a compound of the formula

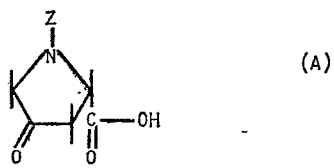 (A)

with a Wittig Reagent of the formula $$R=P(C_6H_5)_3 \quad (B)$$

to form a compound of the formula

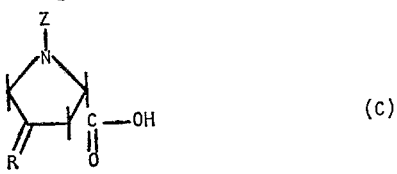 (C)

N-acylating a compound of the formula

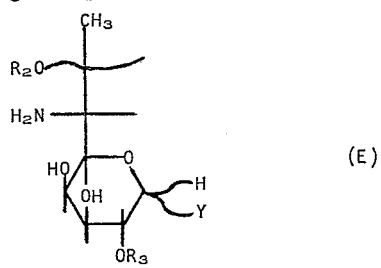

with a compound of Formula C to form a compound of the formula

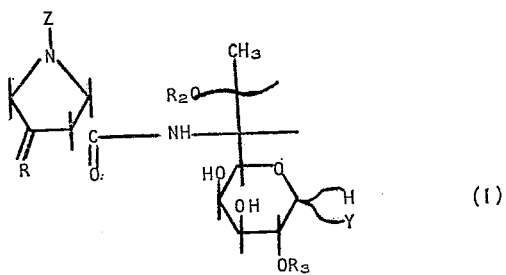

wherein R, $R_2$, $R_3$, Y, and Z are as given in claim 1.

31. A process which comprises N-acylating a compound of the formula

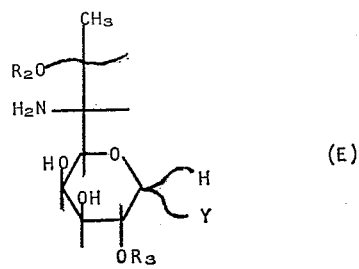

with a compound of the formula

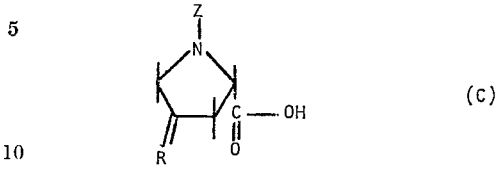

to form a compound of the formula

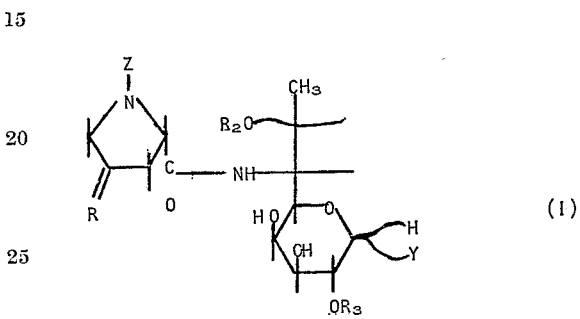

wherein R, $R_2$, $R_3$, Y and Z are as given in claim 1.

References Cited

UNITED STATES PATENTS 3,282,917  11/1966  Magerlein _____ 260—210
3,284,439  11/1966  Argoudelis _____ 260—210

LEWIS GOTTS, *Primary Examiner.*

J. BROWN, *Assistant Examiner.*

UNITED STATES PATENT OFFICE
CERTIFICATE OF CORRECTION

Patent No. 3,380,992                              April 30, 1968

Alexander D. Argoudelis et al.

It is certified that error appears in the above identified patent and that said Letters Patent are hereby corrected as shown below:

Column 4, line 21, "compound VIII" should read -- compound VII --. Column 5, line 57, "garmyl" should read -- formyl --. Column 11, lines 1 to 3,

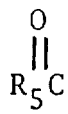      should read      

Column 13, line 4, "[methyl]" should read -- [methyl --; line 6, "octopyranoside" should read -- octopyranoside]. --. Column 14, line 47, "dimethyldiethiocarbamic" should read -- dimethyldithiocarbamic --. Column 21, line 32, "3-cyclohexyl-proplyl" should read -- 3-cyclohexyl-propyl --; line 55, "mehyl" should read -- methyl --. Column 22, line 40, "CHCI$_3$)" should read -- CHCl$_3$) --. Column 25, line 34, "penton" should read -- peptone --; line 57, "as" should read -- was --; line 59, "described" should read -- discarded --. Column 26, line 12, "lincompcin" should read -- lincomycin --; line 16, "tin-layer" should read -- thin-layer --. Column 27, line 45, "acetyl-0-lincosamine" should read -- acetyl-β-lincosamine --. Column 37, line 40, "gives above" should read -- given above --. Column 39, line 38, "is pooled" should read -- in pooled --. Column 55, lines 3 to 13, the formula should appear as shown below:

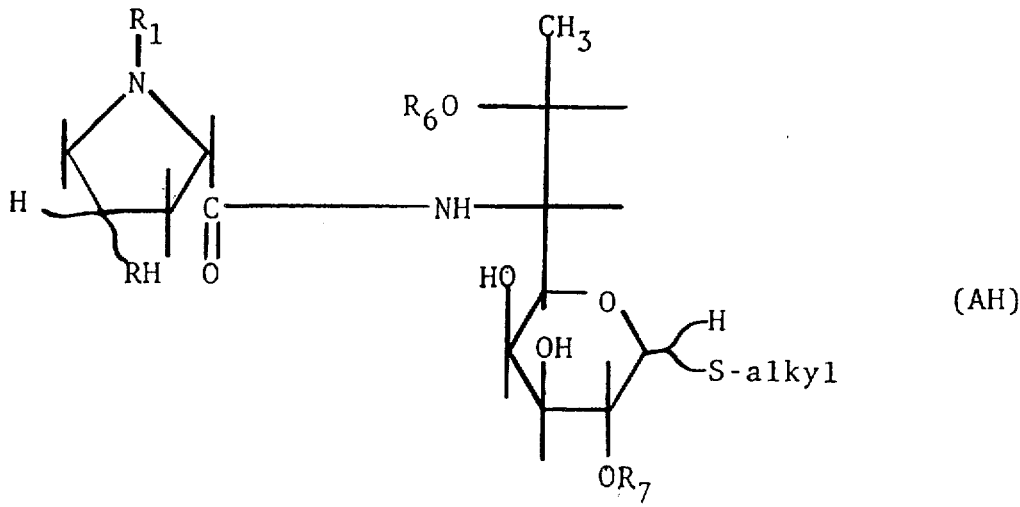

same column 55, lines 45 to 55, the formula should appear as shown below:

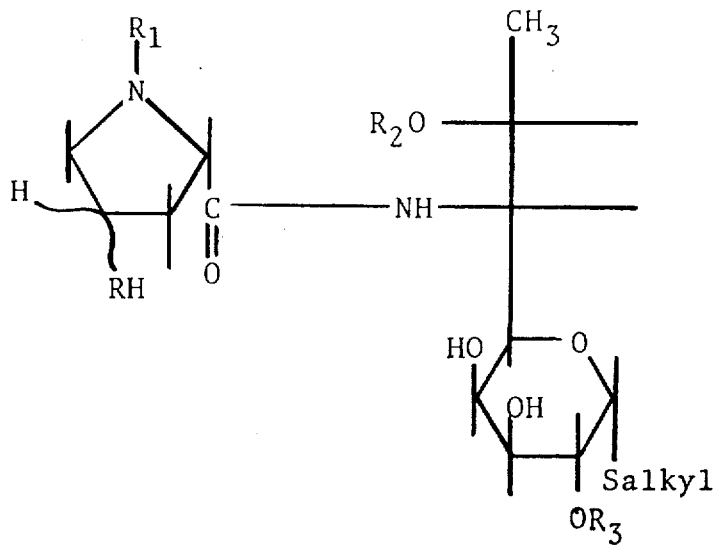

Signed and sealed this 3rd day of March 1970.

(SEAL)
Attest:

EDWARD M. FLETCHER, JR.
Attesting Officer

WILLIAM E. SCHUYLER, JR.
Commissioner of Patents